US009705302B1

(12) United States Patent
Patten

(10) Patent No.: US 9,705,302 B1
(45) Date of Patent: Jul. 11, 2017

(54) COMBINED ELECTRICAL AND MECHANICAL POTTED TERMINATION FOR A CENTER STRENGTH MEMBER CABLE

(71) Applicant: X Development LLC, Mountain View, CA (US)

(72) Inventor: Elias Wolfgang Patten, Mountain View, CA (US)

(73) Assignee: X Development LLC, Mountain View, CA (US)

( * ) Notice: Subject to any disclaimer, the term of this patent is extended or adjusted under 35 U.S.C. 154(b) by 15 days.

(21) Appl. No.: 14/980,852

(22) Filed: Dec. 28, 2015

(51) Int. Cl.
*H02G 15/04* (2006.01)
*H02G 1/14* (2006.01)

(52) U.S. Cl.
CPC ............. *H02G 15/04* (2013.01); *H02G 1/145* (2013.01)

(58) Field of Classification Search
USPC ............................................ 428/364; 174/60
See application file for complete search history.

(56) References Cited

U.S. PATENT DOCUMENTS 2,264,803 A * 12/1941 Jacobs .................. H02G 15/04 174/23 R
2,949,642 A * 8/1960 Lieberman ............ H01R 43/24 174/76
3,550,210 A * 12/1970 Barr ........................ B29C 45/26 425/192 R
3,739,073 A * 6/1973 Schneider ............. H02G 15/06 166/65.1
4,500,151 A * 2/1985 Ayers .................. H01R 13/523 174/76
2001/0005044 A1 6/2001 Fjelstad
2002/0050893 A1* 5/2002 Buck ................... H01R 13/504 335/205
2004/0097144 A1* 5/2004 Campbell ............ F16G 11/048 439/894
2004/0101681 A1* 5/2004 Campbell .............. B29C 70/58 428/364
2010/0144101 A1 6/2010 Chow et al.
2011/0254157 A1 10/2011 Huang et al.
2013/0069222 A1 3/2013 Camacho
2015/0014847 A1 1/2015 Mohammed et al.
2015/0128681 A1* 5/2015 Stier ................. G01N 27/4078 73/23.31

FOREIGN PATENT DOCUMENTS

GB 2212009 A * 7/1989 ............ H02G 15/04

* cited by examiner

*Primary Examiner* — Krystal Robinson
(74) *Attorney, Agent, or Firm* — McDonnell Boehnen Hulbert & Berghoff LLP

(57) ABSTRACT

An energy kite may be coupled to a tether and ground station. The tether or other cables may need to be terminated, where one or more components of the cable need to be separated and terminated individually. In energy kite systems, it is common for the tether (or other cables) to have small mass and diameter. The termination may also include a first potted region with a softer potting material and a second potted region with a harder potting material.

20 Claims, 13 Drawing Sheets

700
795B
750
792
795
795A
786
θ
784
750
792
782
780
760
730
702

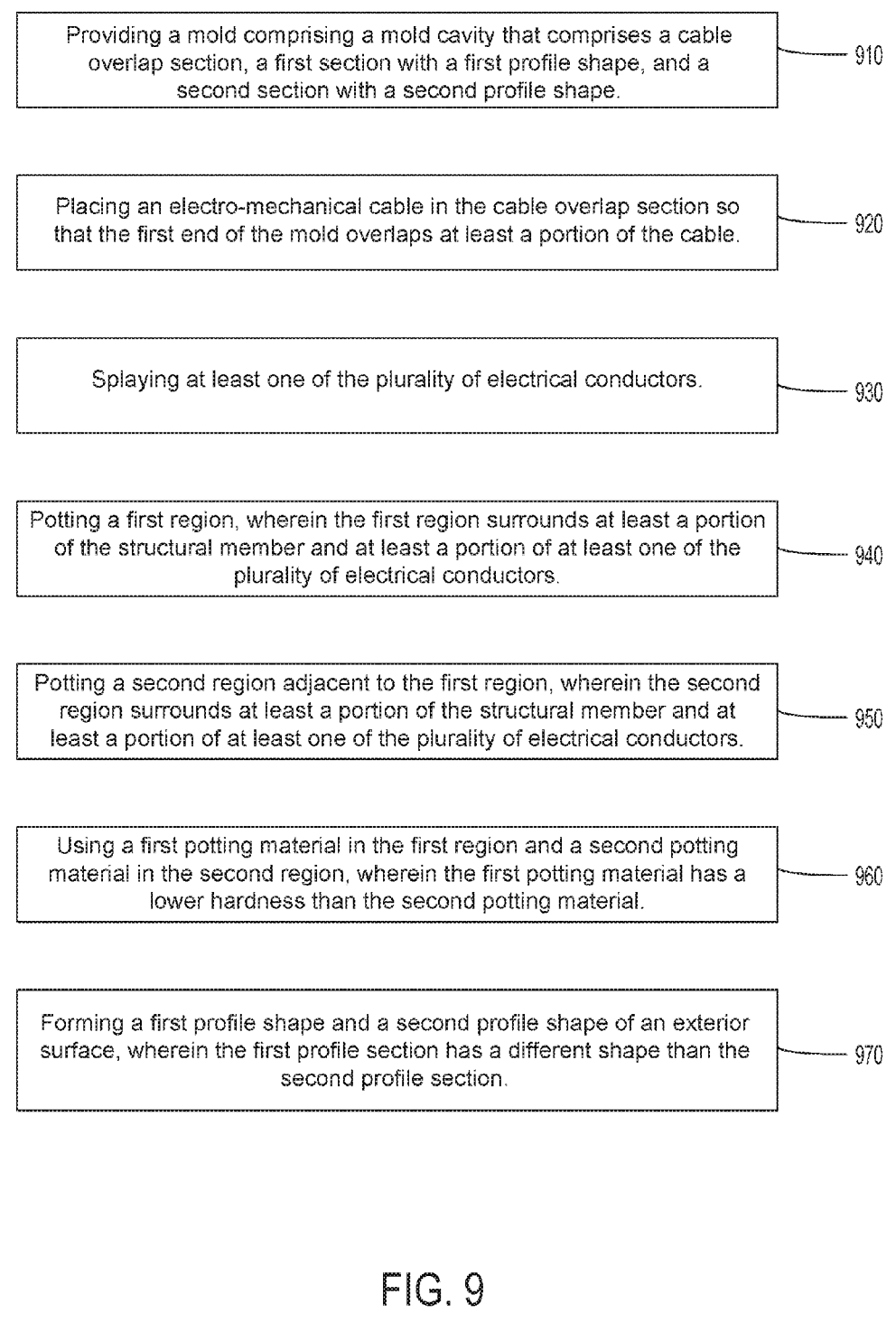

Providing a mold comprising a mold cavity that comprises a cable overlap section, a first section with a first profile shape, and a second section with a second profile shape. 910

Placing an electro-mechanical cable in the cable overlap section so that the first end of the mold overlaps at least a portion of the cable. 920

Splaying at least one of the plurality of electrical conductors. 930

Potting a first region, wherein the first region surrounds at least a portion of the structural member and at least a portion of at least one of the plurality of electrical conductors. 940

Potting a second region adjacent to the first region, wherein the second region surrounds at least a portion of the structural member and at least a portion of at least one of the plurality of electrical conductors. 950

Using a first potting material in the first region and a second potting material in the second region, wherein the first potting material has a lower hardness than the second potting material. 960

Forming a first profile shape and a second profile shape of an exterior surface, wherein the first profile section has a different shape than the second profile section. 970

FIG. 9

COMBINED ELECTRICAL AND MECHANICAL POTTED TERMINATION FOR A CENTER STRENGTH MEMBER CABLE

BACKGROUND

Unless otherwise indicated herein, the materials described in this section are not prior art to the claims in this application and are not admitted to be prior art by inclusion in this section.

Power generation systems may convert chemical and/or mechanical energy (e.g., kinetic energy) to electrical energy for various applications, such as utility systems. As one example, a wind energy system may convert kinetic wind energy to electrical energy.

SUMMARY

Combined electrical and mechanical potted cable terminations are described herein. Generally, the term "potting" refers to applying a liquid "potting material" to components of a cable, where the liquid later solidifies and encapsulates those components. Potting may provide a wedge that can be gripped in a termination and used to transfer load. Potting may also provide environmental protection from moisture, oxidation, thermal shock, vibration shock, and electrical insulation, among other qualities.

Electromechanical cables with external strength members may have terminations that pot the conductors and the strength members together in a single cone or taper. The external strength member cable may have a cone or taper that is generally linear, which tends to concentrate the pressure at the nose of the termination (the nose of the termination may be considered an end of the termination closest to a cable) rather than evenly distributing the shear stresses and pressures. Terminating an internal strength member in this way (e.g., with a generally linear potted cone or taper) would place a high amount of pressure and stress at the nose of the termination. To safely terminate an internal strength member in this way, a much larger termination would be required.

The combined electrical and mechanical potted cable terminations described herein may use a special profile for the tapered potting barrel to more evenly distribute forces (e.g., shear and pressure). For example, a special profile may help evenly distribute forces around the conductors at the nose of the termination. The terminations described herein may also use different potting materials (e.g., potting materials with different hardness) and different interfaces between the potting materials to help evenly distribute forces at the termination.

In one aspect, an electro-mechanical termination is disclosed. The termination may include a first potted region surrounding a structural member and at least one of a plurality of electrical conductors of an electro-mechanical cable. The first potted region may separate the electrical conductors from the structural member. The termination may further include a second potted region adjacent to the first potted region and surrounding the structural member and at least one of the plurality of electrical conductors. The second potted region may further separate the electrical conductors from the structural member.

In another aspect, a method for terminating an electro-mechanical cable is provided. The method includes providing a mold with a mold cavity, where the mold cavity includes a cable overlap section, a first section, and a second section. The cable overlap section includes a cylindrical cavity at a first end of the mold cavity. The first section of the mold cavity includes a first profile shape in longitudinal cross-section between the cable overlap section and the second section. The second section includes a second profile shape in longitudinal cross-section at a second end of the mold cavity. The first profile shape of the first section of the mold cavity is different than the second profile shape of the second section of the mold cavity. The method includes placing a portion of an electro-mechanical cable in the cable overlap section of the mold. The electro-mechanical cable includes a structural member and a plurality of electrical conductors. The method includes splaying at least one of the plurality of electrical conductors. The method includes potting a first region surrounding the structural member and the at least one of the plurality of electrical conductors. The method further includes potting a second region adjacent to the first region. The second region surrounds the structural member and the at least one of the plurality of electrical conductors.

These as well as other aspects, advantages, and alternatives, will become apparent to those of ordinary skill in the art by reading the following detailed description, with reference where appropriate to the accompanying drawings.

BRIEF DESCRIPTION OF THE FIGURES

FIG. 9 is an example flow chart of a method 900, according to some embodiments.

DETAILED DESCRIPTION

Figure 1:
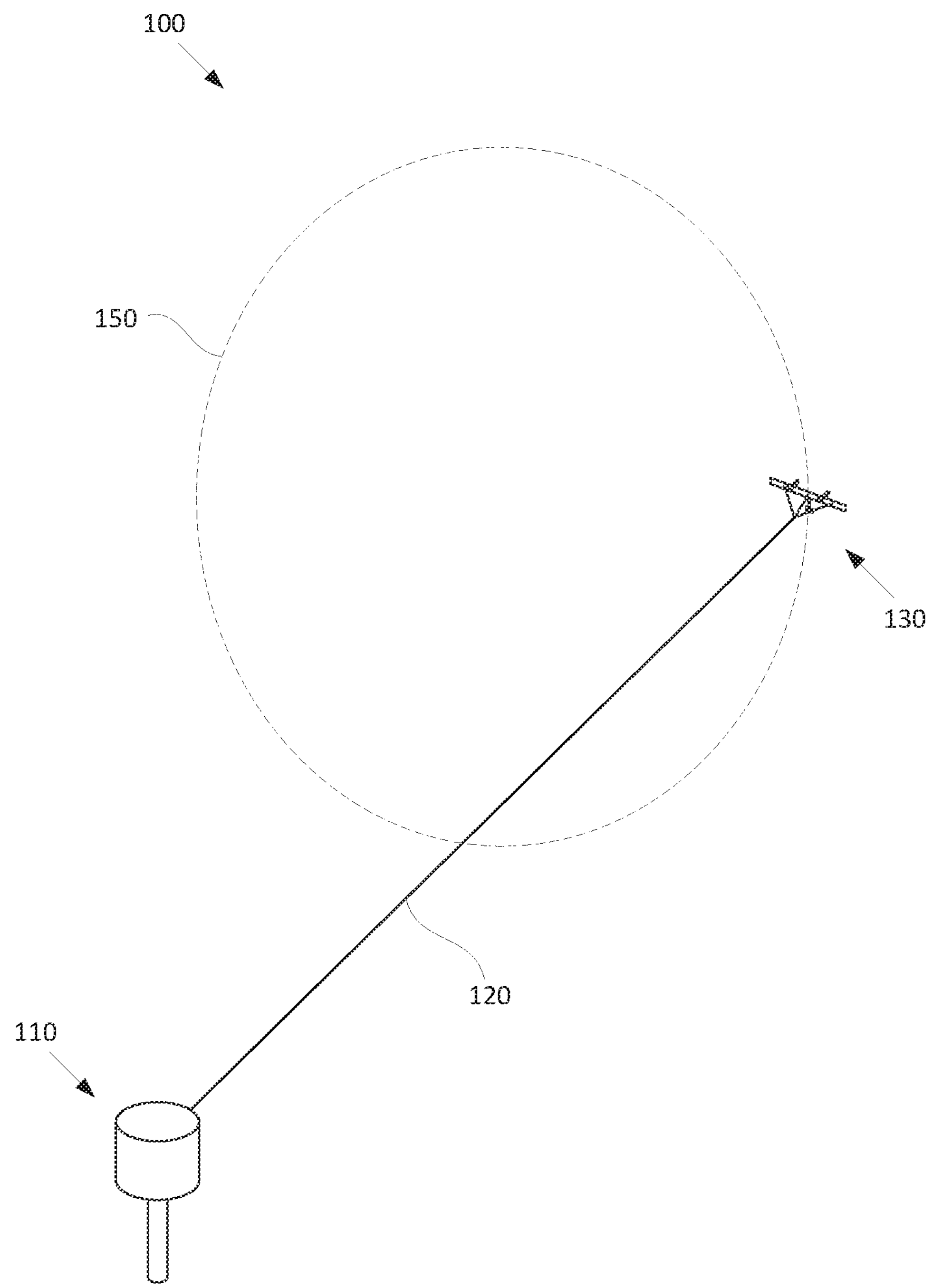
FIG. 1 depicts an Airborne Wind Turbine (AWT), according to an example embodiment.

Exemplary systems and methods are described herein. It should be understood that the word "exemplary" is used herein to mean "serving as an example, instance, or illustration." Any embodiment or feature described herein as "exemplary" or "illustrative" is not necessarily to be construed as preferred or advantageous over other embodiments or features. More generally, the embodiments described herein are not meant to be limiting. It will be readily understood that certain aspects of the disclosed systems can be arranged and combined in a wide variety of different configurations, all of which are contemplated herein.

Overview

Illustrative embodiments relate to aerial vehicles, which may be used in a wind energy system. An example of such an aerial vehicle is an energy kite, which may also be called an Airborne Wind Turbine (AWT). In particular, illustrative embodiments may relate to or take the form of combined electrical and mechanical potted terminations that may be used in energy kite systems.

By way of background, an AWT may include an aerial vehicle that flies in a closed path, such as a substantially circular path, to convert kinetic wind energy to electrical energy. In an illustrative implementation, the aerial vehicle may be connected to a ground station via a tether. While tethered, the aerial vehicle can: (i) fly at a range of elevations and substantially along the path, and return to the ground, and (ii) transmit electrical energy to the ground station via the tether. (In some implementations, the ground station may transmit electricity to the aerial vehicle for take-off and/or landing.)

In an AWT, an aerial vehicle may rest in and/or on a ground station (or perch) when the wind is not conducive to power generation. When the wind is conducive to power generation, such as when a wind speed may be 3.5 meters per second (m/s) at an altitude of 200 meters (m), the ground station may deploy (or launch) the aerial vehicle. In addition, when the aerial vehicle is deployed and the wind is not conducive to power generation, the aerial vehicle may return to the ground station.

Moreover, in an AWT, an aerial vehicle may be configured for hover flight and crosswind flight. Crosswind flight may be used to travel in a motion, such as a substantially circular motion, and thus may be the primary technique that is used to generate electrical energy. Hover flight in turn may be used by the aerial vehicle to prepare and position itself for crosswind flight. In particular, the aerial vehicle could ascend to a location for crosswind flight based at least in part on hover flight. Further, the aerial vehicle could take-off and/or land via hover flight.

In hover flight, a span of a main wing of the aerial vehicle may be oriented substantially parallel to the ground, and one or more propellers of the aerial vehicle may cause the aerial vehicle to hover over the ground. In some implementations, the aerial vehicle may vertically ascend or descend in hover flight. Moreover, in crosswind flight, the aerial vehicle may be oriented, such that the aerial vehicle may be propelled by the wind substantially along a closed path, which as noted above, may convert kinetic wind energy to electrical energy. In some implementations, one or more rotors of the aerial vehicle may generate electrical energy by slowing down the incident wind.

Embodiments described herein may relate to or take the form of a combined electrical and mechanical potted termination for a tether. In an illustrative implementation, the potted termination may help to evenly distribute load away from the nose of the termination by using at least two potting materials with different hardnesses and a tapered profile.

Illustrative Systems

A. Airborne Wind Turbine (AWT)

FIG. 1 depicts an AWT 100, according to an example embodiment. In particular, the AWT 100 includes a ground station 110, a tether 120, and an aerial vehicle 130. As shown in FIG. 1, the tether 120 may be connected to the aerial vehicle on a first end and may be connected to the ground station 110 on a second end. In this example, the tether 120 may be attached to the ground station 110 at one location on the ground station 110, and attached to the aerial vehicle 130 at three locations on the aerial vehicle 130. However, in other examples, the tether 120 may be attached at multiple locations to any part of the ground station 110 and/or the aerial vehicle 130.

The ground station 110 may be used to hold and/or support the aerial vehicle 130 until it is in an operational mode. The ground station 110 may also be configured to allow for the repositioning of the aerial vehicle 130 such that deploying of the device is possible. Further, the ground station 110 may be further configured to receive the aerial vehicle 130 during a landing. The ground station 110 may be formed of any material that can suitably keep the aerial vehicle 130 attached and/or anchored to the ground while in hover flight, crosswind flight, and other flight modes, such as forward flight (which may be referred to as airplane-like flight). In some implementations, a ground station 110 may be configured for use on land. However, a ground station 110 may also be implemented on a body of water, such as a lake, river, sea, or ocean. For example, a ground station could include or be arranged on a floating off-shore platform or a boat, among other possibilities. Further, a ground station 110 may be configured to remain stationary or to move relative to the ground or the surface of a body of water.

In addition, the ground station 110 may include one or more components (not shown), such as a winch, that may vary a length of the tether 120. For example, when the aerial vehicle 130 is deployed, the one or more components may be configured to pay out and/or reel out the tether 120. In some implementations, the one or more components may be configured to pay out and/or reel out the tether 120 to a predetermined length. As examples, the predetermined length could be equal to or less than a maximum length of the tether 120. Further, when the aerial vehicle 130 lands in the ground station 110, the one or more components may be configured to reel in the tether 120.

The tether 120 may transmit electrical energy generated by the aerial vehicle 130 to the ground station 110. In addition, the tether 120 may transmit electricity to the aerial vehicle 130 in order to power the aerial vehicle 130 for takeoff, landing, hover flight, and/or forward flight. The tether 120 may be constructed in any form and using any material which may allow for the transmission, delivery, and/or harnessing of electrical energy generated by the aerial vehicle 130 and/or transmission of electricity to the aerial vehicle 130. The tether 120 may also be configured to withstand one or more forces of the aerial vehicle 130 when the aerial vehicle 130 is in an operational mode. For example, the tether 120 may include a core configured to withstand one or more forces of the aerial vehicle 130 when the aerial vehicle 130 is in hover flight, forward flight, and/or crosswind flight. In some examples, the tether 120 may have a fixed length and/or a variable length. For instance, in at least one such example, the tether 120 may have a length of 140 meters.

The aerial vehicle 130 may be configured to fly substantially along a closed path 150 to generate electrical energy. The term "substantially along," as used in this disclosure, refers to exactly along and/or one or more deviations from exactly along that do not significantly impact generation of electrical energy.

The aerial vehicle 130 may include or take the form of various types of devices, such as a kite, a helicopter, a wing and/or an airplane, among other possibilities. The aerial vehicle 130 may be formed of solid structures of metal, plastic and/or other polymers. The aerial vehicle 130 may be formed of any material which allows for a high thrust-to-weight ratio and generation of electrical energy which may be used in utility applications. Additionally, the materials may be chosen to allow for a lightning hardened, redundant and/or fault tolerant design which may be capable of handling large and/or sudden shifts in wind speed and wind direction.

The closed path 150 may be various different shapes in various different embodiments. For example, the closed path 150 may be substantially circular. And in at least one such example, the closed path 150 may have a radius of up to 265 meters. The term "substantially circular," as used in this disclosure, refers to exactly circular and/or one or more deviations from exactly circular that do not significantly impact generation of electrical energy as described herein. Other shapes for the closed path 150 may be an oval, such as an ellipse, the shape of a jelly bean, the shape of the number of 8, etc.

The aerial vehicle 130 may be operated to travel along one or more revolutions of the closed path 150.

B. Illustrative Components of an AWT

Figure 2:
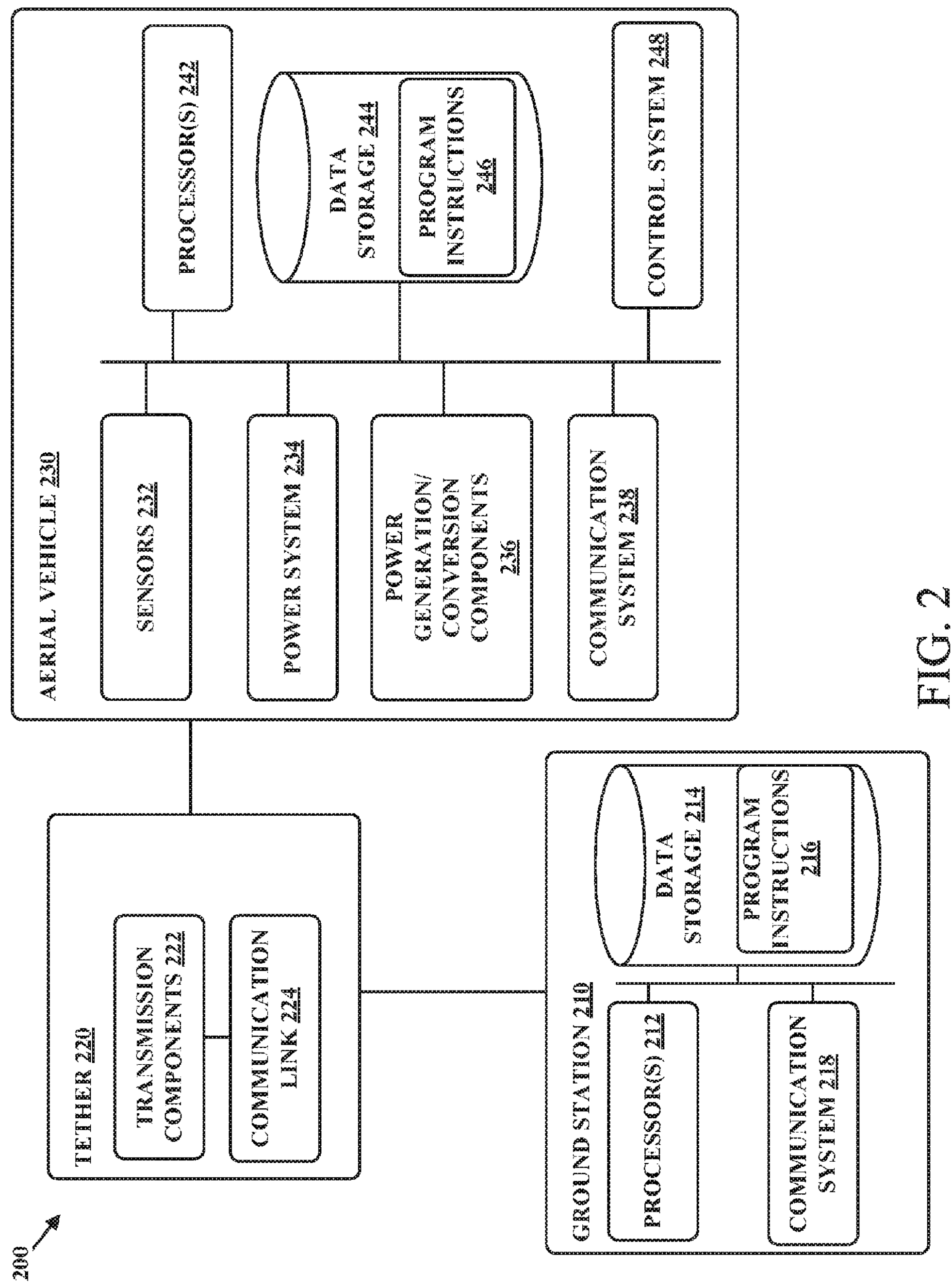
FIG. 2 is a simplified block diagram illustrating components of an AWT, according to an example embodiment.

FIG. 2 is a simplified block diagram illustrating components of the AWT 200. The AWT 100 may take the form of or be similar in form to the AWT 200. In particular, the AWT 200 includes a ground station 210, a tether 220, and an aerial vehicle 230. The ground station 110 may take the form of or be similar in form to the ground station 210, the tether 120 may take the form of or be similar in form to the tether 220, and the aerial vehicle 130 may take the form of or be similar in form to the aerial vehicle 230.

As shown in FIG. 2, the ground station 210 may include one or more processors 212, data storage 214, and program instructions 216. A processor 212 may be a general-purpose processor or a special purpose processor (e.g., digital signal processors, application specific integrated circuits, etc.). The one or more processors 212 can be configured to execute computer-readable program instructions 216 that are stored in a data storage 214 and are executable to provide at least part of the functionality described herein.

The data storage 214 may include or take the form of one or more computer-readable storage media that may be read or accessed by at least one processor 212. The one or more computer-readable storage media can include volatile and/or non-volatile storage components, such as optical, magnetic, organic or other memory or disc storage, which may be integrated in whole or in part with at least one of the one or more processors 212. In some embodiments, the data storage 214 may be implemented using a single physical device (e.g., one optical, magnetic, organic or other memory or disc storage unit), while in other embodiments, the data storage 214 can be implemented using two or more physical devices.

As noted, the data storage 214 may include computer-readable program instructions 216 and perhaps additional data, such as diagnostic data of the ground station 210. As such, the data storage 214 may include program instructions to perform or facilitate some or all of the functionality described herein.

In a further respect, the ground station 210 may include a communication system 218. The communication system 218 may include one or more wireless interfaces and/or one or more wireline interfaces, which allow the ground station 210 to communicate via one or more networks. Such wireless interfaces may provide for communication under one or more wireless communication protocols, such as Bluetooth, WiFi (e.g., an IEEE 802.11 protocol), Long-Term Evolution (LTE), WiMAX (e.g., an IEEE 802.16 standard), a radio-frequency ID (RFID) protocol, near-field communication (NFC), and/or other wireless communication protocols. Such wireline interfaces may include an Ethernet interface, a Universal Serial Bus (USB) interface, or similar interface to communicate via a wire, a twisted pair of wires, a coaxial cable, an optical link, a fiber-optic link, or other physical connection to a wireline network. The ground station 210 may communicate with the aerial vehicle 230, other ground stations, and/or other entities (e.g., a command center) via the communication system 218.

In an example embodiment, the ground station 210 may include communication systems 218 that allows for both short-range communication and long-range communication. For example, the ground station 210 may be configured for short-range communications using Bluetooth and for long-range communications under a CDMA protocol. In such an embodiment, the ground station 210 may be configured to function as a "hot spot"; or in other words, as a gateway or proxy between a remote support device (e.g., the tether 220, the aerial vehicle 230, and other ground stations) and one or more data networks, such as cellular network and/or the Internet. Configured as such, the ground station 210 may facilitate data communications that the remote support device would otherwise be unable to perform by itself.

For example, the ground station 210 may provide a WiFi connection to the remote device, and serve as a proxy or gateway to a cellular service provider's data network, which the ground station 210 might connect to under an LTE or a 3G protocol, for instance. The ground station 210 could also serve as a proxy or gateway to other ground stations or a command center, which the remote device might not be able to otherwise access.

Moreover, as shown in FIG. 2, the tether 220 may include transmission components 222 and a communication link 224. The transmission components 222 may be configured to transmit electrical energy from the aerial vehicle 230 to the ground station 210 and/or transmit electrical energy from the ground station 210 to the aerial vehicle 230. The transmission components 222 may take various different forms in various different embodiments. For example, the transmission components 222 may include one or more conductors that are configured to transmit electricity. And in at least one such example, the one or more conductors may include aluminum and/or any other material which allows for the conduction of electric current. Moreover, in some implementations, the transmission components 222 may surround a core of the tether 220 (not shown).

The ground station 210 could communicate with the aerial vehicle 230 via the communication link 224. The communication link 224 may be bidirectional and may include one or more wired and/or wireless interfaces. Also, there could be one or more routers, switches, and/or other devices or networks making up at least a part of the communication link 224.

Further, as shown in FIG. 2, the aerial vehicle 230 may include one or more sensors 232, a power system 234, power generation/conversion components 236, a communication system 238, one or more processors 242, data storage 244, program instructions 246, and a control system 248.

The sensors 232 could include various different sensors in various different embodiments. For example, the sensors 232 may include a global positioning system (GPS) receiver. The GPS receiver may be configured to provide data that is typical of well-known GPS systems (which may be referred to as a global navigation satellite system (GNNS)), such as the GPS coordinates of the aerial vehicle 230. Such GPS data may be utilized by the AWT 200 to provide various functions described herein.

As another example, the sensors 232 may include one or more wind sensors, such as one or more pitot tubes. The one or more wind sensors may be configured to detect apparent and/or relative wind. Such wind data may be utilized by the AWT 200 to provide various functions described herein.

Still as another example, the sensors 232 may include an inertial measurement unit (IMU). The IMU may include both an accelerometer and a gyroscope, which may be used together to determine the orientation of the aerial vehicle 230. In particular, the accelerometer can measure the orientation of the aerial vehicle 230 with respect to earth, while the gyroscope measures the rate of rotation around an axis, such as a centerline of the aerial vehicle 230. IMUs are commercially available in low-cost, low-power packages. For instance, the IMU may take the form of or include a miniaturized MicroElectroMechanical System (MEMS) or a NanoElectroMechanical System (NEMS). Other types of IMUs may also be utilized. The IMU may include other sensors, in addition to accelerometers and gyroscopes, which may help to better determine position. Two examples of such sensors are magnetometers and pressure sensors. Other examples are also possible.

While an accelerometer and gyroscope may be effective at determining the orientation of the aerial vehicle 230, slight errors in measurement may compound over time and result in a more significant error. However, an example aerial vehicle 230 may be able mitigate or reduce such errors by using a magnetometer to measure direction. One example of a magnetometer is a low-power, digital 3-axis magnetometer, which may be used to realize an orientation independent electronic compass for accurate heading information. However, other types of magnetometers may be utilized as well.

The aerial vehicle 230 may also include a pressure sensor or barometer, which can be used to determine the altitude of the aerial vehicle 230. Alternatively, other sensors, such as sonic altimeters or radar altimeters, can be used to provide an indication of altitude, which may help to improve the accuracy of and/or prevent drift of the IMU. In addition, the aerial vehicle 230 may include one or more load cells configured to detect forces distributed between a connection of the tether 220 to the aerial vehicle 230.

As noted, the aerial vehicle 230 may include the power system 234. The power system 234 could take various different forms in various different embodiments. For example, the power system 234 may include one or more batteries for providing power to the aerial vehicle 230. In some implementations, the one or more batteries may be rechargeable and each battery may be recharged via a wired connection between the battery and a power supply and/or via a wireless charging system, such as an inductive charging system that applies an external time-varying magnetic field to an internal battery and/or charging system that uses energy collected from one or more solar panels.

As another example, the power system 234 may include one or more motors or engines for providing power to the aerial vehicle 230. In some implementations, the one or more motors or engines may be powered by a fuel, such as a hydrocarbon-based fuel. And in such implementations, the fuel could be stored on the aerial vehicle 230 and delivered to the one or more motors or engines via one or more fluid conduits, such as piping. In some implementations, the power system 234 may be implemented in whole or in part on the ground station 210.

As noted, the aerial vehicle 230 may include the power generation/conversion components 236. The power generation/conversion components 236 could take various different forms in various different embodiments. For example, the power generation/conversion components 236 may include one or more generators, such as high-speed, direct-drive generators. With this arrangement, the one or more generators may be driven by one or more rotors. And in at least one such example, the one or more generators may operate at full rated power wind speeds of 11.5 meters per second at a capacity factor which may exceed 60 percent, and the one or more generators may generate electrical power from 40 kilowatts to 600 megawatts.

Moreover, as noted, the aerial vehicle 230 may include a communication system 238. The communication system 238 may take the form of or be similar in form to the communication system 218. The aerial vehicle 230 may communicate with the ground station 210, other aerial vehicles, and/or other entities (e.g., a command center) via the communication system 238.

In some implementations, the aerial vehicle 230 may be configured to function as a "hot spot"; or in other words, as a gateway or proxy between a remote support device (e.g., the ground station 210, the tether 220, other aerial vehicles) and one or more data networks, such as cellular network and/or the Internet. Configured as such, the aerial vehicle 230 may facilitate data communications that the remote support device would otherwise be unable to perform by itself.

For example, the aerial vehicle 230 may provide a WiFi connection to the remote device, and serve as a proxy or gateway to a cellular service provider's data network, which the aerial vehicle 230 might connect to under an LTE or a 3G protocol, for instance. The aerial vehicle 230 could also serve as a proxy or gateway to other aerial vehicles or a command station, which the remote device might not be able to otherwise access.

As noted, the aerial vehicle 230 may include the one or more processors 242, the program instructions 246, and the data storage 244. The one or more processors 242 can be configured to execute computer-readable program instructions 246 that are stored in the data storage 244 and are executable to provide at least part of the functionality described herein. The one or more processors 242 may take the form of or be similar in form to the one or more processors 212, the data storage 244 may take the form of or be similar in form to the data storage 214, and the program instructions 246 may take the form of or be similar in form to the program instructions 216.

Moreover, as noted, the aerial vehicle 230 may include the control system 248. In some implementations, the control system 248 may be configured to perform one or more functions described herein. The control system 248 may be implemented with mechanical systems and/or with hardware, firmware, and/or software. As one example, the control system 248 may take the form of program instructions stored on a non-transitory computer readable medium and a processor that executes the instructions. The control system 248 may be implemented in whole or in part on the aerial vehicle 230 and/or at least one entity remotely located from the aerial vehicle 230, such as the ground station 210. Generally, the manner in which the control system 248 is implemented may vary, depending upon the particular application.

While the aerial vehicle 230 has been described above, it should be understood that the methods and systems described herein could involve any suitable aerial vehicle that is connected to a tether, such as the tether 220 and/or the tether 120.

C. Illustrative Aerial Vehicle

Figure 3:
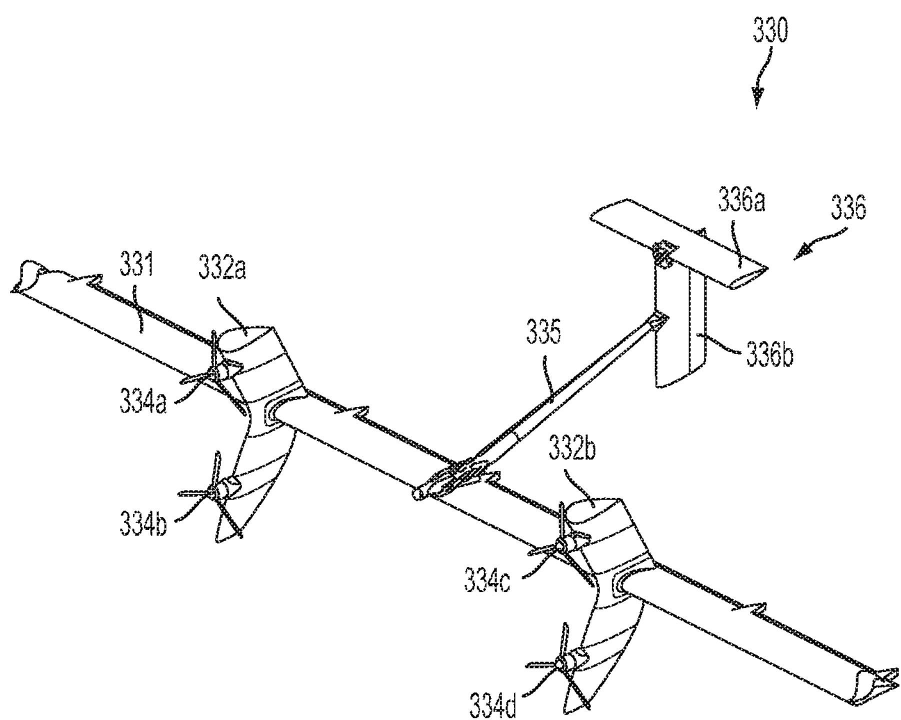
FIG. 3 depicts an aerial vehicle, according to an example embodiment.

FIG. 3 depicts an aerial vehicle 330, according to an example embodiment. The aerial vehicle 130 and/or the aerial vehicle 230 may take the form of or be similar in form to the aerial vehicle 330. In particular, the aerial vehicle 330 may include a main wing 331, pylons 332*a*, 332*b*, rotors 334*a*, 334*b*, 334*c*, 334*d*, a tail boom 335, and a tail wing assembly 336. Any of these components may be shaped in any form which allows for the use of components of lift to resist gravity and/or move the aerial vehicle 330 forward.

The main wing 331 may provide a primary lift force for the aerial vehicle 330. The main wing 331 may be one or more rigid or flexible airfoils, and may include various control surfaces, such as winglets, flaps (e.g., Fowler flaps, Hoerner flaps, split flaps, and the like), rudders, elevators, spoilers, dive brakes, etc. The control surfaces may be used to stabilize the aerial vehicle 330 and/or reduce drag on the aerial vehicle 330 during hover flight, forward flight, and/or crosswind flight.

The main wing 331 and pylons 332*a*, 332*b* may be any suitable material for the aerial vehicle 330 to engage in hover flight, forward flight, and/or crosswind flight. For example, the main wing 331 and pylons 332*a*, 332*b* may include carbon fiber and/or e-glass, and include internal supporting spars or other structures. Moreover, the main wing 331 and pylons 332*a*, 332*b* may have a variety of dimensions. For example, the main wing 331 may have one or more dimensions that correspond with a conventional wind turbine blade. As another example, the main wing 331 may have a span of 8 meters, an area of 4 meters squared, and an aspect ratio of 15.

The pylons 332*a*, 332*b* may connect the rotors 334*a*, 334*b*, 334*c*, and 334*d* to the main wing 331. In some examples, the pylons 332*a*, 332*b* may take the form of, or be similar in form to, a lifting body airfoil (e.g., a wing). In some examples, a vertical spacing between corresponding rotors (e.g., rotor 334*a* and rotor 334*b* on pylon 332*a*) may be 0.9 meters.

The rotors 334*a*, 334*b*, 334*c*, and 334*d* may be configured to drive one or more generators for the purpose of generating electrical energy. In this example, the rotors 334*a*, 334*b*, 334*c*, and 334*d* may each include one or more blades, such as three blades or four blades. The rotor blades may rotate via interactions with the wind and be used to drive the one or more generators. In addition, the rotors 334*a*, 334*b*, 334*c*, and 334*d* may also be configured to provide thrust to the aerial vehicle 330 during flight. With this arrangement, the rotors 334*a*, 334*b*, 334*c*, and 334*d* may function as one or more propulsion units, such as a propeller. Although the rotors 334*a*, 334*b*, 334*c*, and 334*d* are depicted as four rotors in this example, in other examples the aerial vehicle 330 may include any number of rotors, such as less than four rotors or more than four rotors (e.g., eight rotors).

A tail boom 335 may connect the main wing 331 to the tail wing assembly 336, which may include a tail wing 336*a* and a vertical stabilizer 336*b*. The tail boom 335 may have a variety of dimensions. For example, the tail boom 335 may have a length of 2 meters. Moreover, in some implementations, the tail boom 335 could take the form of a body and/or fuselage of the aerial vehicle 330. In such implementations, the tail boom 335 may carry a payload.

The tail wing 336*a* and/or the vertical stabilizer 336*b* may be used to stabilize the aerial vehicle 330 and/or reduce drag on the aerial vehicle 330 during hover flight, forward flight, and/or crosswind flight. For example, the tail wing 336*a* and/or the vertical stabilizer 336*b* may be used to maintain a pitch of the aerial vehicle 130 during hover flight, forward flight, and/or crosswind flight. The tail wing 336*a* and the vertical stabilizer 336*b* may have a variety of dimensions. For example, the tail wing 336*a* may have a length of 2 meters. Moreover, in some examples, the tail wing 336*a* may have a surface area of 0.45 meters squared. Further, in some examples, the tail wing 336*a* may be located 1 meter above a center of mass of the aerial vehicle 130.

While the aerial vehicle 330 has been described above, it should be understood that the systems described herein could involve any suitable aerial vehicle that is connected to an airborne wind turbine tether, such as the tether 120 and/or the tether 220.

D. Aerial Vehicle Coupled to a Ground Station Via a Tether

Figure 4:
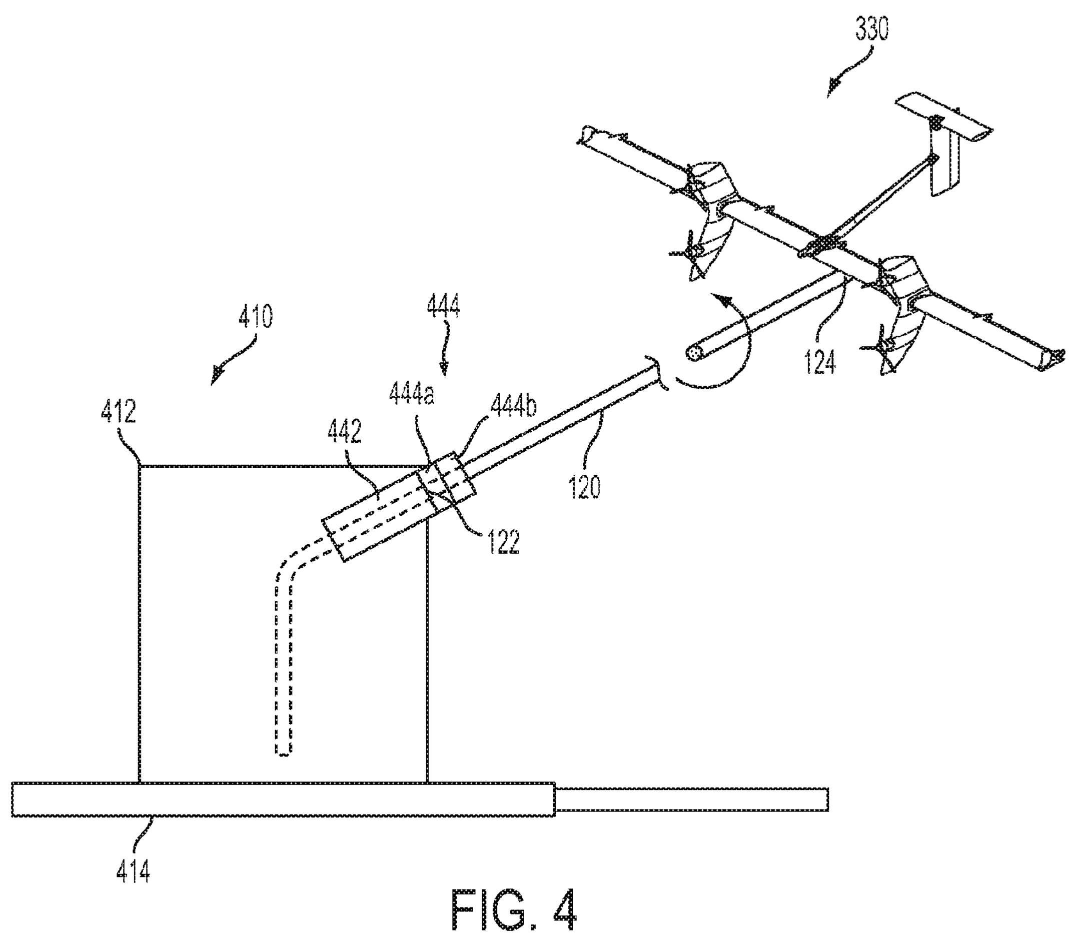
FIG. 4 depicts an aerial vehicle coupled to a ground station via a tether, according to an example embodiment.

FIG. 4 depicts the aerial vehicle 330 coupled to a ground station 510 via the tether 120. Referring to FIG. 4, the ground station 410 may include a winch drum 412 and a platform 414. The ground station 110 and/or the ground station 210 may take the form of or be similar in form to the ground station 410. FIG. 4 is for illustrative purposes only and may not reflect all components or connections.

As shown in FIG. 4, the tether 120 may be coupled to a tether gimbal assembly 442 at a proximate tether end 122 and to the aerial vehicle 330 at a distal tether end 124. In some embodiments, the aerial vehicle 300 may be coupled to the distal tether end 124 via one or more bridles (not shown). Disclosed embodiments for terminations may be used for any termination, such as bridle terminations, tether terminations, or other cable terminations.

Additionally or alternatively, at least a portion of the tether 120 (e.g., the at least one insulated electrical conductor) may pass through the tether gimbal assembly 442. In some embodiments, the tether 120 may terminate at the tether gimbal assembly 442. Moreover, as shown in FIG. 4, the tether gimbal assembly 442 may also be coupled to the winch drum 412 which in turn may be coupled to the platform 414. In some embodiments, the tether gimbal assembly 442 may be configured to rotate about one or more axes, such as an altitude axis and an azimuth axis, in order to allow the proximate tether end 122 to move in those axes in response to movement of the aerial vehicle 330.

A rotational component 444 located between the tether 120 and the tether gimbal assembly 442 may allow the tether 120 to rotate about the long axis of the tether 120. The long axis is defined as extending between the proximate tether end 122 and the distal tether end 124. In some embodiments, at least a portion of the tether 120 may pass through the rotational component 444. Moreover, in some embodiments, the tether 120 may pass through the rotational component 444. Further, in some embodiments, the rotational component 444 may include a fixed portion 444*a* and a rotatable portion 444*b*, for example, in the form of one or more bearings and/or slip rings. The fixed portion 444*a* may be coupled to the tether gimbal assembly 442. The rotatable portion 444*b* may be coupled to the tether 120.

The use of the word fixed in the fixed portion 444*a* of the rotational component 444 is not intended to limit fixed portion 444*a* to a stationary configuration. In this example, the fixed portion 444*a* may move in axes described by the tether gimbal assembly 442 (e.g., altitude and azimuth), and may rotate about the ground station 410 as the winch drum 412 rotates, but the fixed portion 444*a* will not rotate about the tether 120, i.e., with respect to the long axis of the tether 120. Moreover, in this example, the rotatable portion 444*b* of the rotational component 444 may be coupled to the tether 120 and configured to substantially rotate with the rotation of tether 120.

Via the rotational component 444, the tether 120 may rotate about its centerline along the long axis as the aerial vehicle 330 orbits. The distal tether end 124 may rotate a different amount then the proximate tether end 122, resulting in an amount of twist along the length of the tether 420. With this arrangement, the amount of twist in the tether 420 may vary based on a number of parameters during crosswind flight of the aerial vehicle 330.

E. Illustrative Electro-Mechanical Cables

Figure 5:
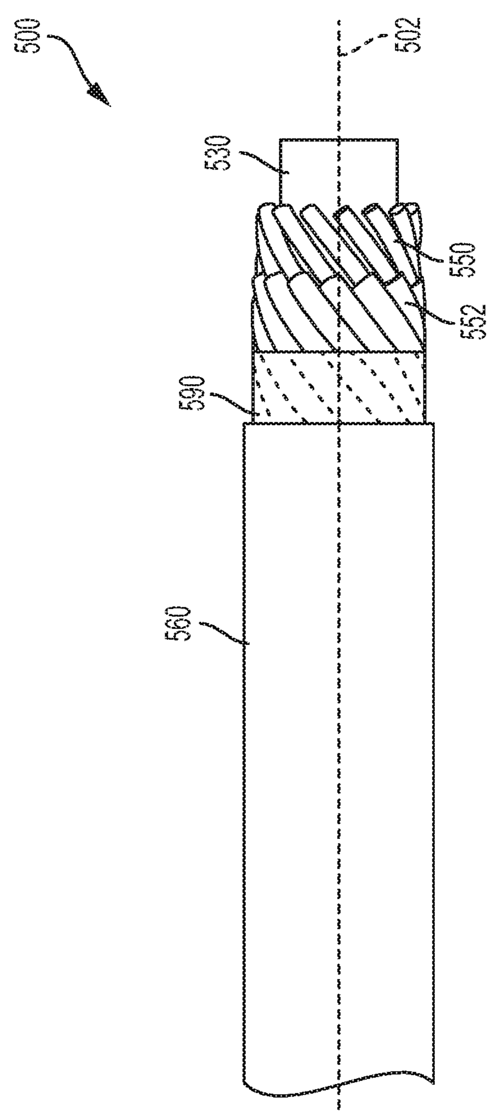
FIG. 5 depicts an electro-mechanical cable 500 with a center strength member 530, according to some embodiments.

FIG. 5 depicts an electro-mechanical cable 500 with a center strength member, or structural member 530, according to some embodiments. FIG. 5 and the remaining Figures depicting termination systems and methods are for illustrative purposes only and may not reflect all components or connections. Further, as illustrations, the Figures may not reflect actual operating conditions but are merely to illustrate the embodiments described. Further still, the relative dimensions in the Figures may not be to scale but are merely to illustrate the embodiments described.

FIG. 5 depicts conductors 550 helically wrapped about a structural member 530 of a cable 500. The cable 500 may include a structural member 530, a plurality of electrical conductors 550, and a jacket 560. The cable 500 may have a long axis 502. For purposes of illustration only, the cable 500 in FIG. 5 is shown with a portion of some components removed (e.g., the jacket 560 and the plurality of electrical conductors 550) to illustrate the arrangement of components in the cable 500. Accordingly, FIG. 5 may be referred to as a partial cutaway view of the cable 500.

The structural member 530 may be wrapped fiber filaments that have been consolidated and cured into a strong, stiff link. In some embodiments, the structural member 530 may provide a significant contribution to the tensile strength and/or shear strength of the cable 500. Beneficially, the structural member 530 may improve resistance of the cable 500 to fatigue loads while an AWT (e.g., the AWT 100 and/or AWT 200) is in operation. Further, the structural member 530 may improve resistance of various components of the cable 500 to fatigue or tensile loads, such as the plurality of electrical conductors 550.

The structural member 530 may take various different forms in various different embodiments. For example, in some embodiments, the structural member 530 may comprise pultruded fiber rod, carbon fiber rod, fiberglass, one or more metals (e.g., aluminum), and/or a combination of carbon fiber, fiberglass, and/or one or more metals. As one example, the structural member 530 may comprise a combination of fibers, such as a first carbon fiber having a first modulus and second carbon fiber having a second modulus that is greater than the first modulus. As another example, the structural member 530 may comprise carbon fiber and fiberglass. Further, the structural member 530 may comprise a matrix composite and/or carbon fiber and/or fiberglass, such as a metal matrix composite (e.g., aluminum matrix composite).

In some embodiments, the structural member 530 may have a circular cross-section shape or may comprise other cross-section shapes. For example, in some embodiments, the structural member 530 may have an elliptical shape (e.g., with an aspect ratio of about 2:1), a trapezoidal cross-section shape, a pie-wedge cross-section shape, a rectangular cross-section shape, a triangular cross-section shape, etc. In addition, in some embodiments, the structural member 530 may have a cross-section shape that varies along the long axis 502 of the cable 500. Although cables are generally described herein as having one structural member 530, this is not intended to be limiting. Cables may have more than one structural member 530.

Further, the plurality of electrical conductors 550 may be configured to transmit electricity. For example, the plurality of electrical conductors 550 may be configured for high-voltage AC or DC power transmission (e.g., greater than 1,000 volts). For instance, the plurality of electrical conductors 550 may be configured to carry an AC or DC voltage of between 1 kilovolt and 5 kilovolts, or higher, and an associated power transmission current of between 50 amperes to 250 amperes.

In some embodiments, as shown in FIG. 5, the plurality of electrical conductors 550 may be helically wound around the outer surface of the structural member 530. The plurality of electrical conductors 530 may be wound in other ways. For example, in some embodiments, electrical conductors in the plurality of electrical conductors 550 may have an alternating arrangement around the outer surface of the structural member 530, or a reverse oscillating lay around the outer surface of the structural member 530.

In some embodiments, the plurality of electrical conductors 550 may include groups of electrical conductors that define separate electrical paths. Further, in some embodiments, the groups of electrical conductors may be configured to operate differently. For instance, in an AC power transmission arrangement, a first group of electrical conductors may be configured to carry a first phase of electrical power along a first electrical path, a second group of electrical conductors may be configured to carry a second phase of electrical power along a second electrical path that is different from the first phase of electrical power, and so on. Moreover, in a DC power transmission arrangement, a first group of electrical conductors may be configured to operate at a first potential along a first electrical path, a second group of electrical conductors may be configured to operate at a second potential along a second electrical path that is different from the first potential, and so on. As one example, the first potential may be +2000 volts relative to ground, and the second potential may be −2000 volts relative to ground. As another example, the first potential may be a high voltage, and the second potential may be near ground potential.

In some embodiments, each electrical conductor of the plurality of electrical conductors 550 may comprise the same material and have the same thickness. However, in some embodiments, at least two electrical conductors of the plurality of electrical conductors 550 may comprise different materials and/or have different thicknesses. For example, in some embodiments, an electrical conductor in the first group of electrical conductors that is adjacent to an electrical conductor in the second group of electrical conductors may have a different thickness than an electrical conductor in the first group of electrical conductors that is adjacent to two electrical conductors in the first group of electrical conductors.

Moreover, in some embodiments, each electrical conductor of the plurality of electrical conductors 550 may include an insulating layer 552. However, in other embodiments, at least one electrical conductor of the plurality of electrical conductors 550 may not include an insulating layer.

In some embodiments, the cable 500 may further include a fill material 590 located between the conductors 550 and the jacket 560, such that the fill material 590 fills the interstices. With this arrangement, the fill material 590 may block moisture from the plurality of electrical conductors 550. For instance, in some embodiments, the fill material 590 may block moisture from diffusing inside of the cable 500 along the plurality of electrical conductors 550.

Fill material 590 may take various different forms in various different embodiments. For instance, in some embodiments, the fill material 590 may include a vulcanizing rubber on silicone, such as a room-temperature vulcanizing rubber. In addition, the fill material 590 may include mylar. Further, in some such embodiments, the fill material 590 may comprise one or more filler rods, fibers, and/or tapes.

The jacket 560 may take various different forms in various different embodiments. For instance, the jacket 560 may include a thermoplastic polyurethane ("TPU"), polypropylene, hytrel, and/or nylon (e.g., nylon 11). In some embodiments, the jacket 560 may be extruded over the plurality of electrical conductors 550. Moreover, in some embodiments, when the cable 500 includes the fill material 590, the jacket 560 may be extruded over the fill material 590. Further, in some embodiments, the jacket 560 may have a preferred thickness of 1.2 or 1.5 millimeters. Other thicknesses are possible as well.

In some embodiments, one or more materials of the jacket 560 may be selected to increase the visibility of the cable 500 to humans and/or animals. For instance, in some embodiments, the jacket 560 may include materials that have a white or bright color, or a contrasting color pattern. Further, in some embodiments, the jacket 560 may include a material or coating that reflects ultra-violet (UV) light, glows, or a combination of UV reflection and glowing.

Further, in some examples, the cable 500 may further include at least one fiber optic cable and/or a coaxial conductor (not shown). The fiber optic cable or coaxial conductor may be configured for communication between an aerial vehicle (e.g., the aerial vehicle 330) and a ground station (e.g., the ground station 410 via the tether 120). In some embodiments, the fiber optic cable or coaxial cable may be wound around the outer surface structural member 530 in the same or similar way as the plurality of electrical conductors 550 are wound. Yet further, in some examples, the cable 500 may further include an electro-optical processor ("EOP").

Figure 6A:
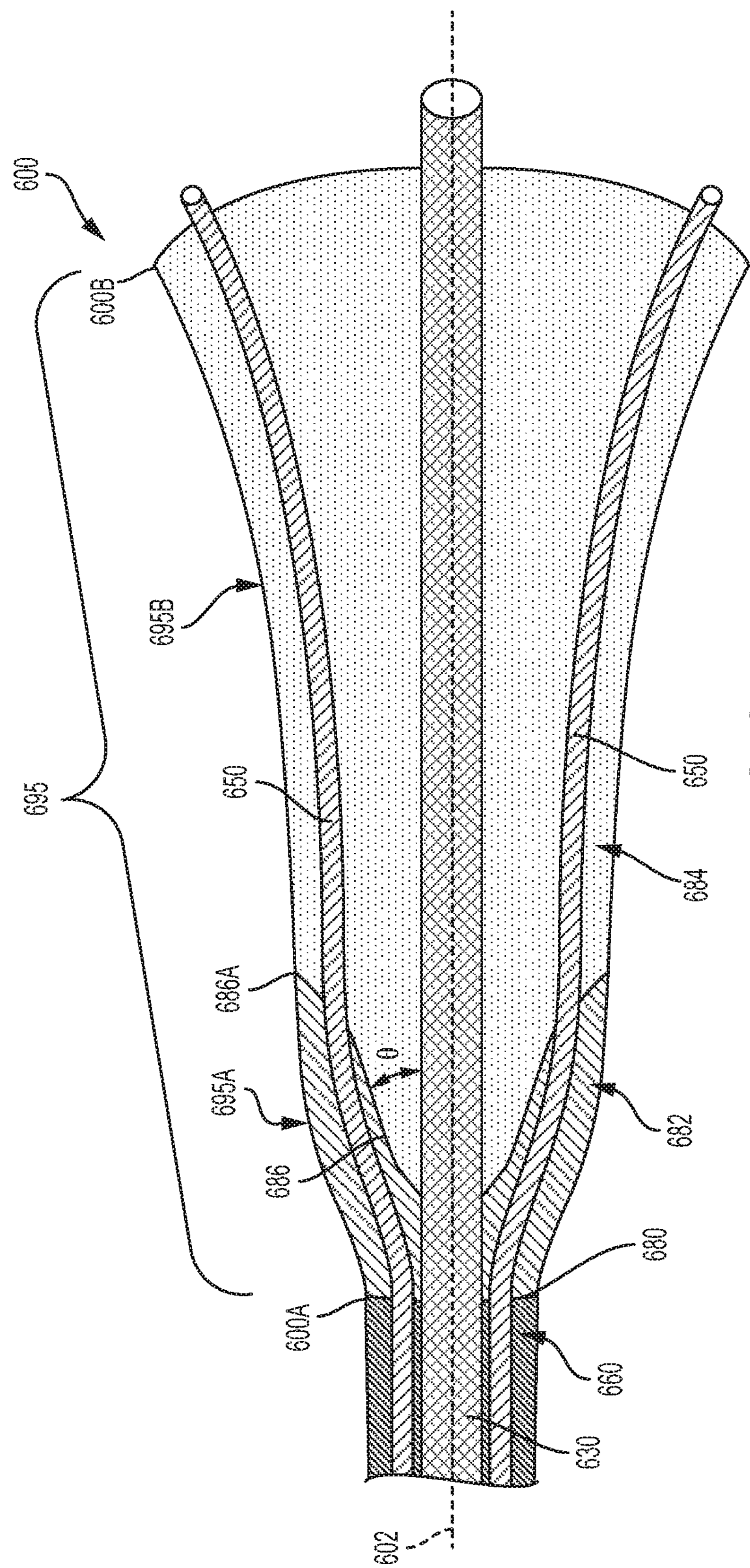
FIG. 6A depicts a cross-section view along the long axis of a combined electrical and mechanical potted termination 600 for a center strength member cable, according to some embodiments.
Figure 6B:
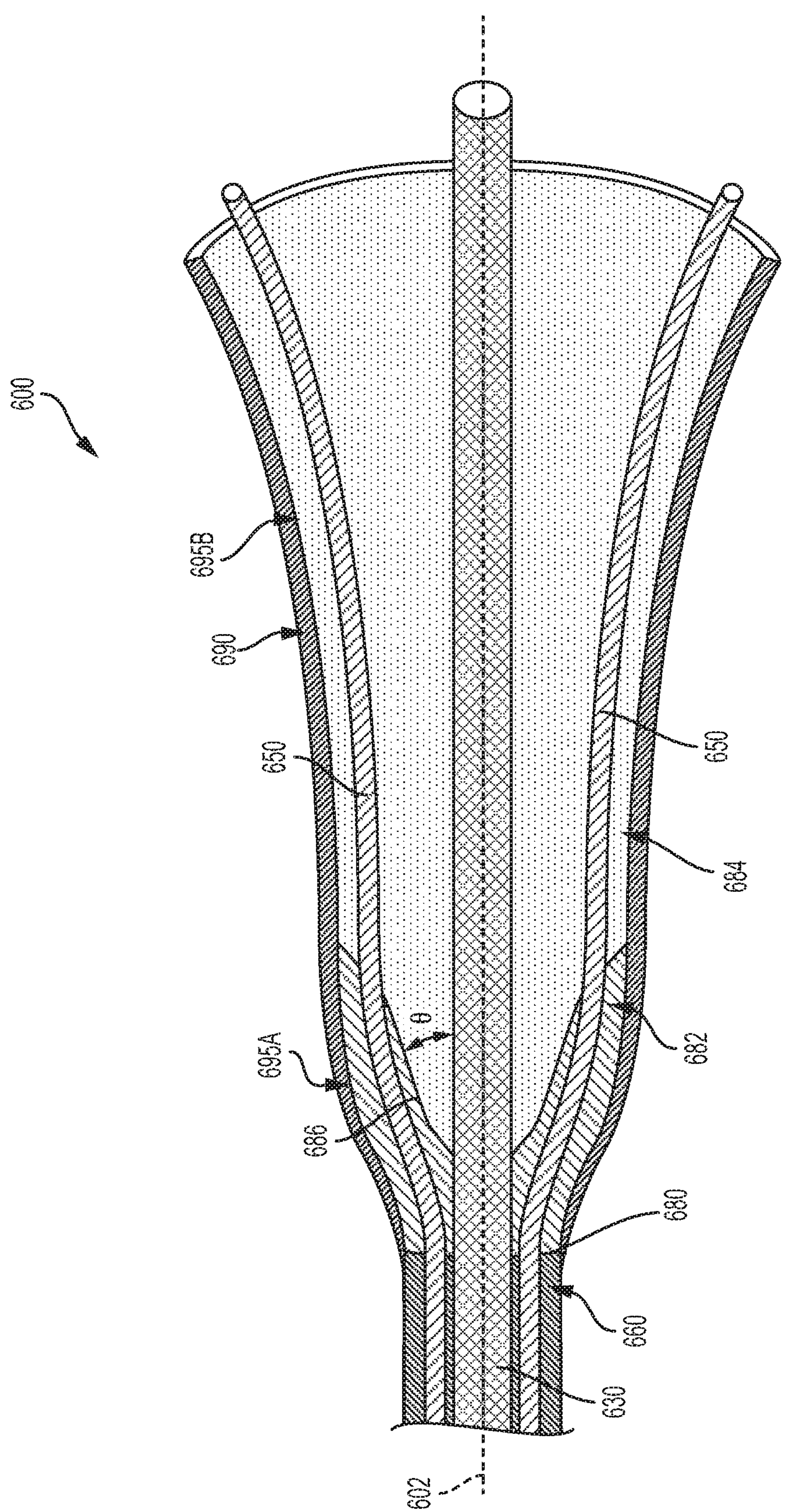
FIG. 6B depicts a cross-section view along the long axis of a combined electrical and mechanical potted termination 600 for a center strength member cable with a cone member, according to some embodiments.
Figure 6C:
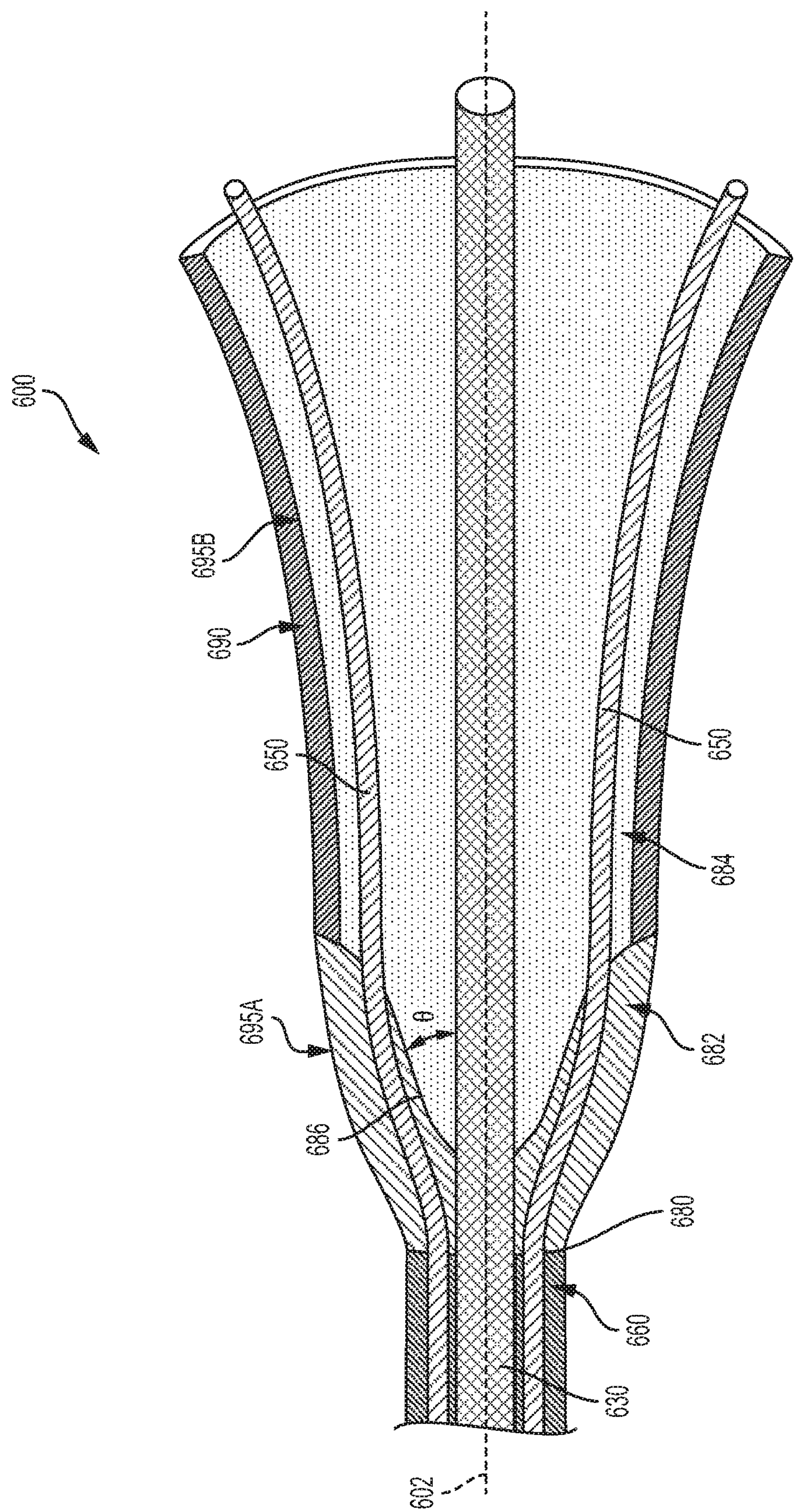
FIG. 6C depicts a cross-section view along the long axis of a combined electrical and mechanical potted termination 600 for a center strength member cable with a cone member, according to some embodiments.
Figure 6D:
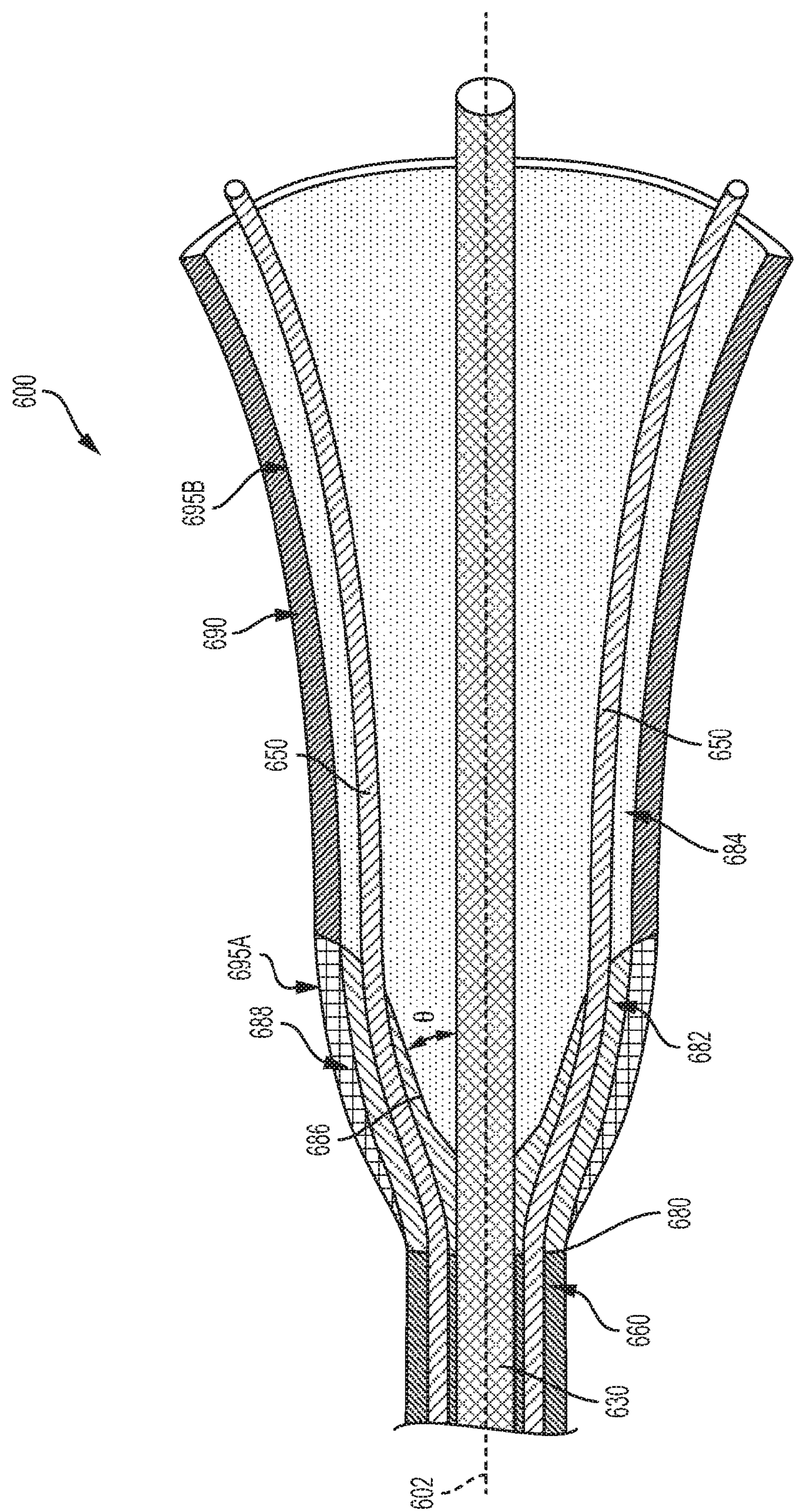
FIG. 6D depicts a cross-section view along the long axis of a combined electrical and mechanical potted termination 600 for a center strength member cable with a cone member, according to some embodiments.

In general, FIGS. 6A-6D depict a cross-section view along the long axis of a combined electrical and mechanical potted termination 600 for a center strength member cable, according to some embodiments. The termination 600 of FIGS. 6A-6D, a long axis 602, a structural member 630, one or more electrical conductors 650, a jacket 660 (possibly similar to jacket 560 of the cable 500 in FIG. 5 as described above), a cable-to-termination interface 680, a first potted region 682, a second potted region 684, a first-to-second region interface 686, a first profile shape 695A, a second profile shape 695B and a cone angle θ. FIG. 6A further includes a first exterior surface point 600A, a second exterior surface point 600B, a third exterior surface point 686A, and an exterior surface 695 that includes the first profile shape 695A and the second profile shape 695B. FIGS. 6B-6D also include a cone member 690. FIG. 6D further includes a third potted region 688.

Although only two electrical conductors 650 are depicted in FIGS. 6A-6D, more than two electrical conductors 650 may be run through the termination 600. According to one embodiment, beginning at the cable-to-termination interface 680 and continuing throughout the termination 600, the electrical conductors 650 are radially separated from the structural member 630. As illustrated in FIG. 6A, through the first potted region 682 the electrical conductors 650 are separated from the structural member 630 and then through the second potted region 684 the electrical conductors 650 are further separated from the structural member 630.

The first potted region 682 may use a potting material that is a relatively soft material, such as a silicone or a soft polyurethane. The first potted region 682 may pot both the conductors 650 and the structural member 630. The exterior surface 695 of the first potted region 682 may have the first profile shape 695A. The second potted region 684 may use a potting material that is harder than the relatively soft material used in the first potted region 682. For example, the second potted region 684 may use an epoxy, polyester, or other resin to pot the electrical conductors 650 and the structural member 630. Further, the exterior surface 695 of the second potted region 682 may have the second profile shape 695B. Other embodiments may include additional potted regions and/or profile shapes.

The termination 600 may have exterior surface 695 shaped with one or more sections (which may be produced via a tapered potting barrel or mold) with possibly one or more profile shapes from a longitudinal cross-section perspective, such as the first profile shape 695A and the second profile shape 695B of exterior surface 695 as depicted in FIG. 6A. The exterior surface 695 may include a section that corresponds to the exterior of a potted region of the termination 600. For example, a first section of the exterior surface 695 may correspond to the first potted region 682. In one embodiment, the exterior surface 695 may include exterior points, such as the first exterior point 600A (located at the cable-to-termination interface 680), the second exterior point 600B (located at a distal end of the termination 600 opposite of the cable-to-termination interface 680), and the third exterior point 686A (located at the first-to-second region interface 686). The exterior points may define different sections of the exterior surface 695. For example, as shown in FIG. 6A, the first section of the exterior surface 695 may include a portion of the exterior surface 695 from the first exterior point 600A to the third exterior point 686A. A second section of the exterior surface 695 may correspond to the second potted region 684. As shown in FIG. 6A, the second section of the exterior surface 695 may include a portion of the exterior surface 695 from the third exterior point 686A to the second exterior point 600B.

The profile shape(s) of exterior surface 695 may be tapered or sloped such that the termination 600 is radially smaller at the first exterior point 600A compared to the third exterior point 686A and the termination 600 is radially smaller at the third exterior point 686A compared to the second exterior point 600B. The profile shape(s) of exterior surface 695 may help provide an even distribution of forces, e.g., around the conductors at the cable-to-termination interface 680 (which may be referred to as a "nose" of the termination 600).

According to one embodiment, in which the exterior surface 695 termination 600 may have more than one section, a first exterior section of the exterior surface 695 may have the first profile shape 695A in longitudinal cross-section that corresponds to the first potted region 682. Further, a second exterior section of the exterior surface 695 may have the second profile shape 695B in longitudinal cross-section that corresponds to the second potted region 684. In one example, the first profile shape 695A may be different than the second profile shape 695B. According to one embodiment, the first profile shape 695A may include a convex portion and a concave portion relative to the long axis 602. In another example, the second profile shape 695B may include a convex portion relative to the long axis 602.

According to one embodiment, one or more profile shapes of the exterior surface 695 of the termination 600 may decrease forces experienced at or near the cable-to-termination interface 680 in comparison to forces that may be experienced if the termination 600 had a single, generally linear profile shape or external shape. In one example, where the first profile shape 695A is different than the second profile shape 695B, an effect of forces experienced throughout the termination 600 may be reduced. So for example, the first profile shape 695A may include a convex portion followed by a concave portion, and then the second profile shape 695B may have a convex portion adjacent to the convex portion of the first profile shape 695A.

An overall profile shape of the exterior surface 695, including the first profile shape 695A and the second profile shape 695B as described, may reduce potential cracking, damage, or other failure of the termination 600. According to some embodiments, multiple profile shapes, such as the first profile shape 695A and the second profile shape 695B as described herein, with different alternating concave and convex shapes that include varying tapers and/or slopes throughout, may help decrease the forces experienced in the termination 600. Better distribution of forces and/or reduced forces throughout the termination 600 may improve physical integrity of the termination 600 and prevent breaking, cracking, or other material failures within the termination 600.

The exterior surface 695 may be configured for specific applications with varying tapers, profiles and/or slopes along the length of the termination 600. Factors that may affect the optimization of the one or more profile shapes of exterior surface 695, including the first profile shape 695A and/or the second profile shape 695B may include, without limitation, an estimated stress distribution in the termination 600, a specific cable (or tether) being used, a stiffness of the resin used for pottings, a friction between the potting material and a side of the termination 600 (e.g., a metal cone part of the termination 600 such as cone member 690), a load in the tether, a strength of the tether, shear strength limitations of the resin and resin-structural member interface, peak loads, and material properties of the components (e.g., the structural member 630 and the plurality of electrical conductors 650).

FIGS. 6B-6D further include the cone member 690, with each Figure reflecting an exemplary embodiment of termination 600 and cone member 690. The cone member 690 may be constructed from a metal or an alloy of metals. As illustrated in FIG. 6B, the cone member 690 may completely surround the potted termination 600, specifically an exterior surface 695 of the first potted region 682 and the second potted region 684. The cone member 690 may connect to the exterior surface 695 in any number of ways, including, for example, using adhesive or using threading on the exterior surface 695 of the termination 600 that corresponds to threading on an interior of the cone member 690 (not shown).

As illustrated in FIG. 6C, the cone member 690 may only surround the second potted region 684 of the termination 600. According to one embodiment, the first potted region 682 may extend radially beyond the second potted region 684 and at least a portion of the first potted region 682 that extends radially beyond the second potted region 684 may be adjacent and/or interface with the cone member 690. Relative to FIG. 6B, the first potted region 682 in FIG. 6C may be molded differently, such as into a larger or wider shape similar to the shape shown in FIG. 6C, for example.

In yet other embodiments, as illustrated in FIG. 6D, the cone member 690 may surround the second potted region, but then may attach to or interface with a third potted region 688, where the third potted region 688 may surround the first potted region 682. The third potted region 688 may be similar to the first potted region 682 or the second potted region 684 and also the third potted region 688 may extend the termination 600 outward in a radial direction. The third potted region 688 may also be lighter and/or more flexible than the first potted region 682 and/or the second potted region 684. As shown in FIG. 6D, the cone member 690 may not interface nor surround the first potted region 682, but may only interface with the second potted region 684 and the third potted region 688.

The embodiments illustrated in FIGS. 6C-6D may reduce a bending strain or stress in the termination 600 because of the larger shape of the first potted region in FIG. 6C or the addition of the third potted region 688 in FIG. 6D.

The termination 600 may include one or more interfaces, such as a cable-to-termination interface 680 and a first-to-second region interface 686. As depicted in FIGS. 6A-6D, the cable-to-termination interface 680 may be substantially perpendicular to the long axis 602 of the termination 600. These interfaces may simply describe the intersection of two pieces of material and not include additional structure. For example, the first-to-second region interface 686 may simply describe the intersection of the first potting material of the first potted region 682 and the second potting material of the second potted region 684. In one example, at least a portion of the first-to-second region interface 686 forms a cone coaxial to the long axis 602 of the structural member 603 with the cone angle θ relative to the long axis 602 of the termination 600.

Determining the cone angle θ during a potting process may be based on minimizing a step-change in stiffness to avoid a stress concentration between the structural member 630 and the second potted region 682. In one embodiment, determining the cone angle θ that avoids a stress concentration may reduce potential breaking, cracking, or other structural damage or failure of the termination 600 when a force is applied to the termination 600. In one embodiment, it may be preferred for the cone angle θ to be between 15 and 75 degrees. In another embodiment, it may be even more preferable for angle θ to be between 30 and 45 degrees.

In other embodiments, an interface may include one or more additional components or elements. For example, the first-to-second region interface 686 may include filler material or another component between the first potting material of the first potted region 682 and the second potting material of the second potted region 684. In some examples, filler material or other components making up an interface may include means for attaching the regions or materials together. In other embodiments, there may be other similar interfaces, such as between the first potted region 682 and the third potted region 688, or between the cone member 690 and one or more of a potted region.

Figure 7:
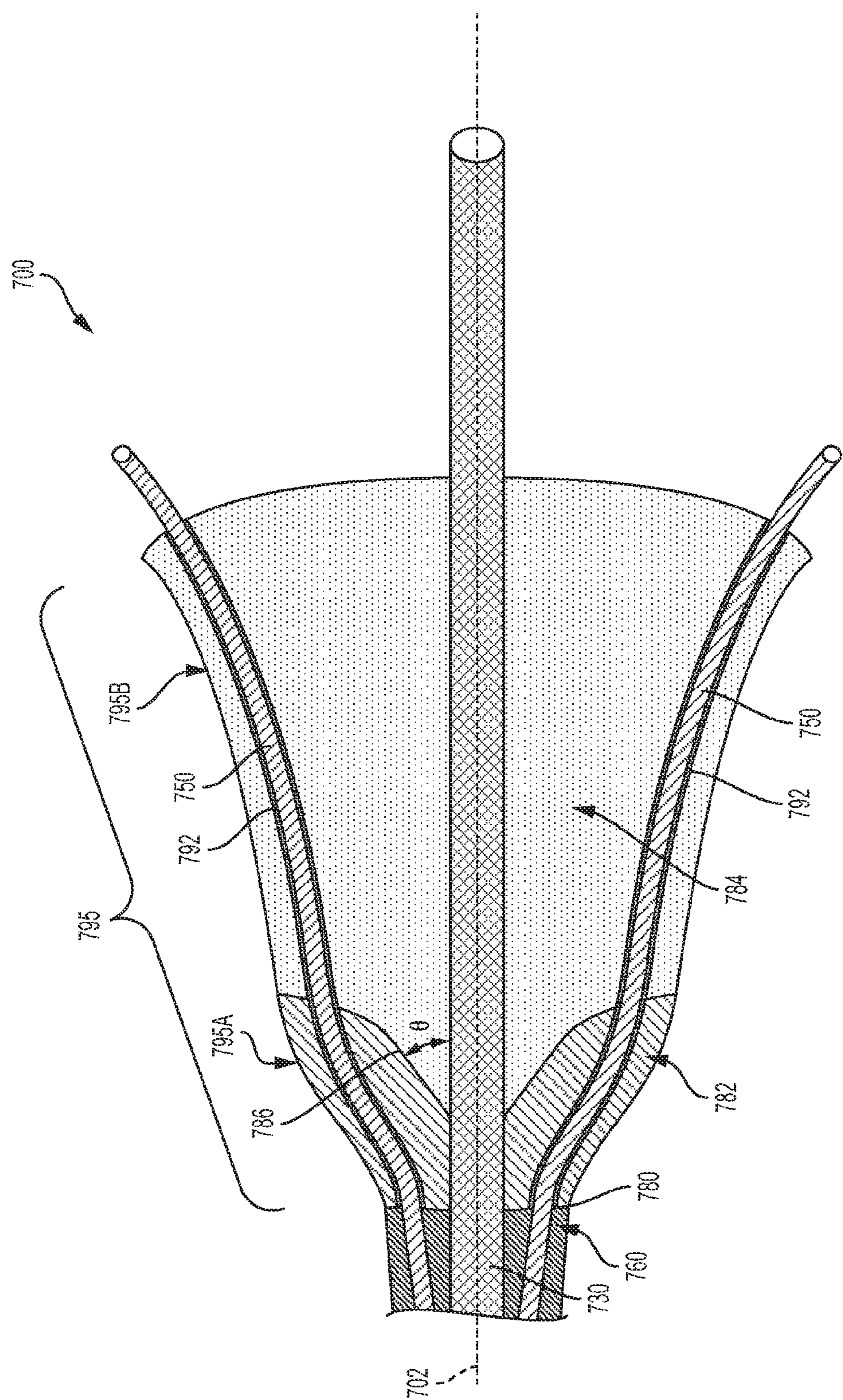
FIG. 7 depicts a cross-section view along the long axis of a combined electrical and mechanical potted termination 700 for a center strength member cable, according to some embodiments.

FIG. 7 depicts a cross-section view along the long axis of a combined electrical and mechanical potted termination 700 for a center strength member cable, according to some embodiments. The termination 700 of FIG. 7 includes, a long axis 702, a structural member 730, one or more electrical conductors 750, a jacket 760 (possibly similar to jacket 560 of the cable 500 in FIG. 5 as described above), a cable-to-termination interface 780, a first potted region 782, a second potted region 784, a first-to-second region interface 786, a third exterior surface point 786A, one or more protective sheaths 792, an exterior surface 795 including a first profile shape 795A and a second profile shape 795B, and a cone angle θ.

In one example, the termination 700 may include one or more protective sheaths 792, and each individual protective sheath may be coaxial and surround each individual electrical conductor 750 within the termination. The protective sheaths 792 may be considered a metal or plastic tubing or sleeve that each of the conductors 750 may slide in to help provide additional stiffness that may help protect the electrical conductors 750 from compressive stresses that may be present in the termination 700.

Similar to FIG. 6, as depicted in FIG. 7, in one embodiment, the exterior surface 795 may include one or more profile shapes that correspond to potted regions. For example, the exterior surface 795 may include a first profile shape 795A that corresponds to the first potted region 782 and a second profile shape 795B that corresponds to the second potted region 784. In such an example, the first profile shape 795A may have an increased concave shape and/or convex curves with even greater slope changes compared to the first profile shape 695A depicted in FIG. 6. As illustrated in FIG. 7, with the first profile shape 795A, an end of the termination closest to the cable-to-termination interface 780 may experience less strain in comparison to profile shapes with a lower slopes or less drastic concave and/or convex curves.

Similar to interfaces described above and depicted in FIG. 6, the cable-to-termination interface 780 may be substantially perpendicular to the long axis 702 of the termination 700. At least a portion of the first-to-second region interface 786 may be approximately at a cone angle θ, from the long axis 702 of the termination 700. The cone angle θ may be less than ninety degrees from the long axis 702 of the termination 700. In one instance, as illustrated in FIG. 7, where the first profile shape 795A has a more convex curved shape, possibly resulting in a steeper slope of the exterior surface 795 at that portion, cone angle θ may be greater than cone angle θ in FIG. 6. In one embodiment, it may be preferred for the cone angle θ to be between 15 and 75 degrees. In another embodiment, it may be even more preferable for cone angle θ to be between 40 and 60 degrees.

In one embodiment, determining the cone angle θ of the interface 786 may be based on minimizing a step-change in stiffness in order to avoid a stress concentration between the structural member 730 and the second potted region 782 which may help prevent structural damage or failure to the termination 700 when a force is applied to the termination 700. In other embodiments, mechanical potted termination 700 may include a third potted region (similar to the third potted region 688 in FIG. 6D) and/or a cone member (like the cone member 690 in FIG. 6B-6D).

Figure 8:
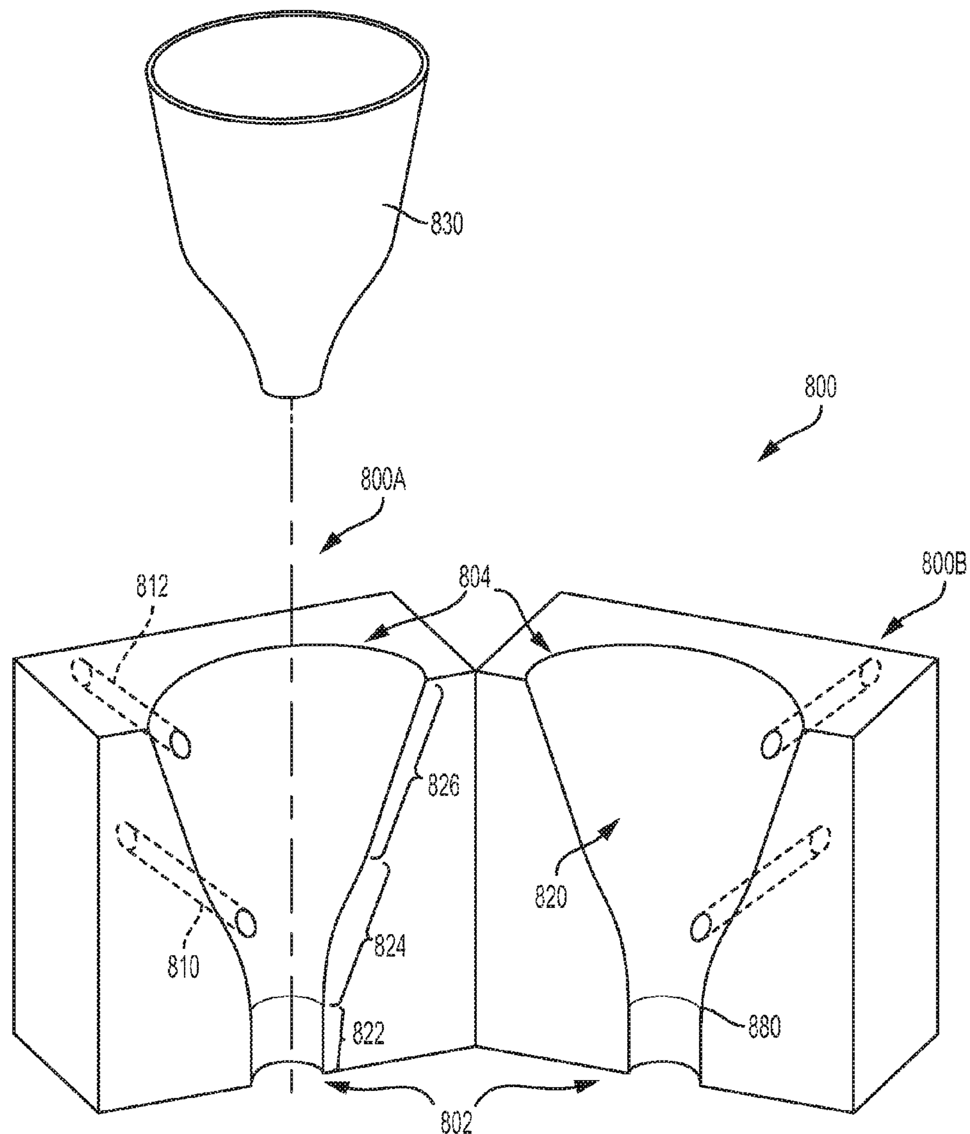
FIG. 8 depicts a perspective view of a tapered potting barrel 800 and a potting insert 830, according to an example embodiment.

FIG. 8 depicts a perspective view of a termination mold 800 and a potting insert 830, according to an example embodiment. The termination mold 800 may also be referred to as a tapered potting barrel. Although the termination mold 800 is depicted in FIG. 8 as a two-piece block, the termination mold 800 may take other shapes, such as a thin shell. The termination mold 800 includes a first barrel piece 800A, a second barrel piece 800B, a first end 802 and a second end 804, a first injection port 810, a second injection port 812, a mold cavity 820, a cable overlap section 822, a first profile section 824, a second profile section 826, a potting insert 830, and a cable-to-termination interface point 880.

According to one embodiment, the first barrel piece 800A and the second barrel piece 800B may be joined together resulting in the mold cavity 820 in the middle of the termination mold 800. The mold cavity 820 may include a cable overlap section 822 that includes a cylindrical cavity at the first end 802 to the cable-to-termination interface point 880. The mold cavity 820 may further include a first profile section 824 that includes a first profile shape in longitudinal cross-section. The mold cavity 820 may also include a second profile section 826 that includes a second profile shape in longitudinal cross-section. The first profile section 824 may be adjacent to and between the cable overlap section 822 and the second profile section 826. The second profile section 826 may be located at the second end 804 and adjacent to the first profile section 824. Further, the first profile shape of the first profile section 824 may be different than the second profile shape of the second profile section 826. In one embodiment, the first profile section 824 may mirror a first profile shape of a first section of an exterior surface of a termination, and the second profile section 826 may mirror a second profile shape of a second section of an exterior surface of a termination.

In operation according to some embodiments, an electromechanical cable may be placed in the cable overlap section 822 of the first barrel piece 800A, the cable continuing from the first end 802 up to the cable-to-termination interface point 880, and then the cable may be prepared for termination. For example, some components of the cable may be removed (e.g., the jacket, filling material, insulation, etc.) and some components may be splayed out or separated out (e.g., the structural member and the plurality of electrical conductors). Splaying of some of the components may be completed by using an internal structure to guide at least one of the one or more electrical conductors. The second barrel piece 800B may be placed over the cable and fit into the first barrel piece 800A to form a single termination mold 800. The cable components for potting may then be positioned for potting. In at least one example, a structural member and a plurality of electrical conductors may continue through the termination mold 800 out the second end 804.

According to at least one embodiment, potting a termination may include at least a two-step potting process to create at least two separate potting regions. This may be completed using potting insert 830, which may act as an inner mold. For example, the potting insert 830 may be placed in the termination mold 800 to shape the interior of a potted region. The potting insert 830 may be placed into the mold cavity 820 coaxial to a long axis of a structural member. The potting insert 830 may include tubes, holes or voids through which components may be run. For example, the structural member of a cable and one or more of the plurality of electrical conductors may be run through the tubes or holes. In some embodiments, the potting insert 830 may serve to hold the components in position for potting. In other embodiments, the components may be positioned for potting in other ways. Furthermore, the potting insert 830 may be shaped in order to form a specific shape of potted regions within the termination. For example, in order to pot a first potting region, such as the first potted region 682 in FIG. 6, the potting insert 830 may be placed in a position within the termination mold 800 such that the first potted region may be formed between an interior surface of the first profile section 824 of the mold cavity 820 and the potting insert 830. In one instance, the shape of potting insert 830 may be used to define cone angle θ shown in FIGS. 6A-6D. An interior surface of the first profile section and the second profile section 824 of the mold cavity 820 may shape a taper or profile shape of an exterior surface of a termination, such as the exterior surface 695 in FIG. 6.

The first injection port 810 may be used to inject the potting material and pot the first region. While using the first injection port 810 to pot the first region, the potting insert 830 may help shape an interface, such as interface 686 described in FIGS. 6A-6D (possibly shaping the interface in a cone coaxial to a structural member at a cone angle θ as described in FIGS. 6A-6D), by acting as another piece of the termination mold 800 that includes the first barrel piece 800A and the second barrel piece 800B. For example then, the first profile section 824 and the potting insert 830 may together define the shape and/or dimensions of a first potted region. After potting the first region, the potting insert 830 may be removed and the second region may be potted. In some embodiments, a second injection port 812 may be used to inject the potting material to pot the second region. In other examples, the potting insert 830 may be used in potting one or more other region(s) in addition to the first potted region of the termination. A potting process may continue to pot other regions in a similar manner to what has described for the first and second potted regions. In some embodiments, the termination mold 800 or tapered potting barrel may be open on top and the second region may be potted without the need for an injection port. Other injection ports may be used as well.

FIG. 9 is an example flow chart of a method 900, according to some embodiments. Method 900, shown in FIG. 9 (and other processes and methods disclosed herein), presents a method that can be implemented within an arrangement involving, for example, the energy kite or AWT 100, 200, the aerial vehicle 330, the ground station 410, the tether 120, the cable 500, the termination 600, 700, and/or the termination mold 800 shown in FIGS. 1-8 (or more particularly by one or more components thereof). Additionally or alternatively, method 900 may be implemented within any other arrangements and systems.

Method 900 and other processes and methods disclosed herein may include one or more operations, functions, or actions as illustrated by one or more of blocks 910-980. Although the blocks are illustrated in sequential order, these blocks may also be performed in parallel, and/or in a different order than those described herein. Also, the various blocks may be combined into fewer blocks, divided into additional blocks, and/or removed based upon the desired implementation.

In addition, for the method 900 and other processes and methods disclosed herein, the flowchart shows functionality and operation of one possible implementation of present implementations. In this regard, each block may represent a module, a segment, or a portion of a program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device. In addition, for the method 900 and other processes and methods disclosed herein, each block in FIG. 9 may represent circuitry that is wired to perform the specific logical functions in the process.

At block 910, method 900 involves providing a mold that includes a mold cavity. The mold cavity may include a cable overlap section comprising a cylindrical cavity at a first end of the mold cavity, a second section comprising a second profile shape in longitudinal cross-section at a second end of the mold cavity, and a first section comprising a first profile shape in longitudinal cross-section between the cable overlap section and the second section, where the first profile shape may be different than the second profile shape. As described herein, the mold may be a two-piece mold and may include various components, such as one or more injection ports, one or more potting inserts and/or a cable overlap section.

At block 920, method 900 involves placing an electro-mechanical cable (similar to the electro-mechanical cable 500) in the cable overlap section of the mold so that the first end of the mold overlaps at least a portion of the cable. The cable may include a structural member, one or more electrical conductors, and other components.

At block 930, method 900 involves splaying at least one of the one or more of the plurality of electrical conductors. In at least one embodiment, the splaying may be completed by utilizing an internal structure, such as a jig, to guide at least one of the one or more electrical conductors. The electrical conductors, along with the structural member, may be extended through the mold cavity out the second end of the mold.

At block 940, method 900 involves potting a first region, wherein the first region surrounds at least a portion of the structural member and at least a portion of at least one of the electrical conductors. In some examples, potting the first region may further include placing a potting insert into the mold cavity coaxial to a long axis of the structural member, and injecting a first potting material between an interior surface of the mold cavity, such as an interior surface of the first section, and an exterior surface of the potting insert.

At block 950, method 900 involves potting a second region adjacent to the first region, wherein the second region surrounds at least a portion of the structural member and at least a portion of at least one of the plurality of electrical conductors. In some examples, potting the second region may further include injecting a second potting material between an interior surface of the mold cavity, such as an interior surface of the second section, and an exterior surface of the potting insert, where a portion of the second potting material is adjacent to the first potting material. In another example, potting the second region may include injecting a second potting material adjacent to the first potting material and an interior surface of the second section of the mold cavity, thus filling the remaining portion of the mold cavity.

At block 960, method 900 involves using a first potting material in the first region and a second potting material in the second region, wherein the first potting material is softer or has a lower hardness than the second potting material.

At block 970, method 900 involves forming a first profile shape and a second profile section of an exterior surface, wherein the first profile shape may be different than the second profile shape. According to some embodiments, the first profile shape may include a convex portion and a concave portion while the second profile shape may include a convex portion.

Figure 10:
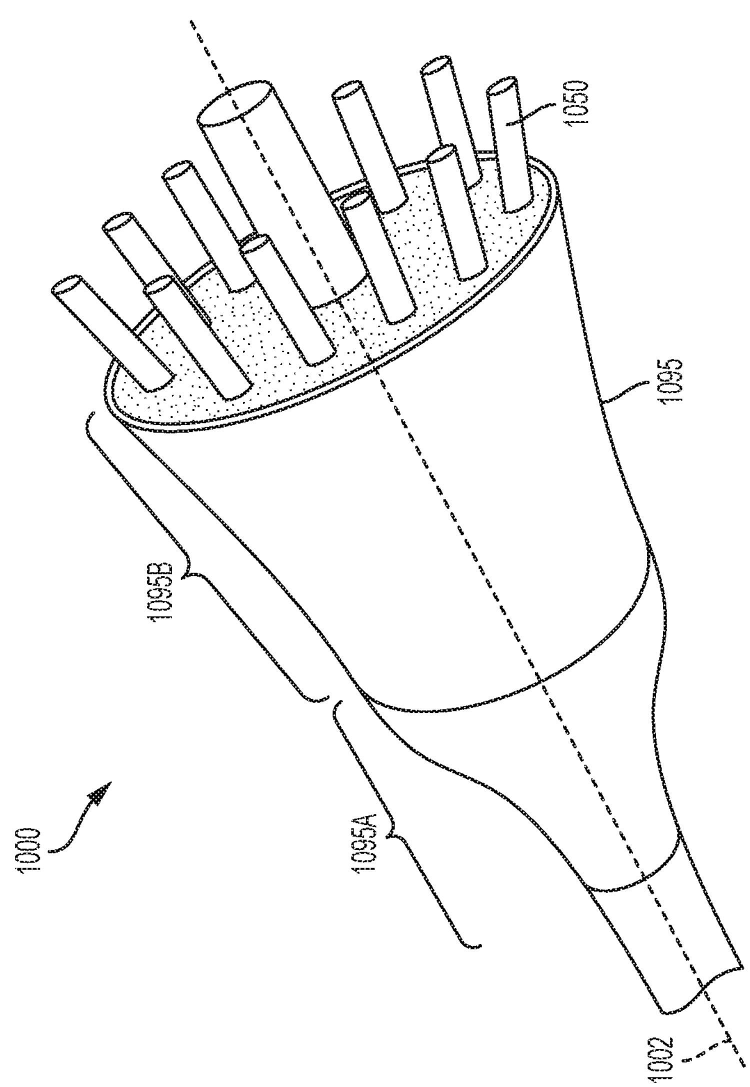
FIG. 10 is a perspective view of a cable 1000 with a termination and a tapered exterior surface, according to some embodiments.

FIG. 10 is a perspective view of a cable 1000 with a termination and a tapered exterior surface, according to some embodiments. The cable 1000 includes a structural member 1030, electrical conductors 1050, a tapered exterior surface 1095 with a first exterior surface profile shape 1095A and a second exterior surface profile shape 1095B.

Although example terminations described above may be used in AWTs, in other examples, terminations described herein may be used for other applications, including overhead transmission, aerostats, subsea and marine applications, including offshore drilling and remotely operated underwater vehicles (ROVs), towing, mining, and/or bridges, among other possibilities.

CONCLUSION

The particular arrangements shown in the Figures should not be viewed as limiting. It should be understood that other embodiments may include more or less of each element shown in a given Figure. Further, some of the illustrated elements may be combined or omitted. Yet further, an exemplary embodiment may include elements that are not illustrated in the Figures.

Additionally, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are contemplated herein.

What is claimed is:

1. An electro-mechanical termination comprising:
- a first potted region surrounding a structural member and at least one of a plurality of electrical conductors of an electro-mechanical cable, wherein the first potted region separates the electrical conductors from the structural member;
- a second potted region adjacent to the first potted region and surrounding the structural member and at least one of the plurality of electrical conductors; wherein the second potted region further separates the electrical conductors from the structural member.

2. The electro-mechanical termination of claim 1, wherein the first potted region is potted with a first material, wherein the second potted region is potted with a second material, and wherein the first material has a lower hardness than the second material.

3. The electro-mechanical termination of claim 2, wherein the first material is silicone or polyurethane.

4. The electro-mechanical termination of claim 2, wherein the second material is an epoxy or polyester resin.

5. The electro-mechanical termination of claim 1, further comprising:
- a first exterior section that has a first profile shape in longitudinal cross-section; and
- a second exterior section that has a second profile shape in longitudinal cross-section, wherein the first profile shape is different than the second profile shape.

6. The electro-mechanical termination of claim 5, wherein the first profile shape comprises a convex portion and a concave portion.

7. The electro-mechanical termination of claim 5, wherein the second profile shape comprises a convex portion.

8. The electro-mechanical termination of claim 5, wherein the first profile shape corresponds to the first potted region and the second profile shape corresponds to the second profile shape.

9. The electro-mechanical termination of claim 1, further comprising:
- an interface between the first potted region and the second potted region, wherein at least a portion of the interface forms a cone coaxial to a long axis of the structural member with a cone angle θ relative to the long axis.

10. The electro-mechanical termination of claim 9, wherein the cone angle θ is between fifteen and seventy-five degrees.

11. The electro-mechanical termination of claim 1, further comprising:
- a plurality of protective sheaths, wherein each individual protective sheath is coaxial to each individual electrical conductor.

12. The electro-mechanical termination of claim 1, further comprising:
- a cone member that surrounds an exterior surface of the first potted region and an exterior surface of the second potted region.

13. The electro-mechanical termination of claim 1, further comprising:
- a cone member that surrounds an exterior surface of the second potted region; and
- a third potted region that surrounds the first potted region and is adjacent to the cone member.

14. The electro-mechanical termination of claim 1, further comprising:
- a cone member that surrounds an exterior surface of the second potted region, wherein the first potted region extends radially beyond the second potted region and at least a portion of the first potted region that extends radially beyond the second potted region is adjacent to the cone member.

15. A method for terminating an electro-mechanical cable comprising:
- providing a mold comprising a mold cavity, the mold cavity comprising:
  - a cable overlap section comprising a cylindrical cavity at a first end of the mold cavity;
  - a second section comprising a second profile shape in longitudinal cross-section at a second end of the mold cavity; and
  - a first section comprising a first profile shape in longitudinal cross-section between the cable overlap section and the second section, wherein the first profile shape is different than the second profile shape;
- placing a portion of an electro-mechanical cable in the cable overlap section of the mold, wherein the electro-mechanical cable comprises a structural member and a plurality of electrical conductors;

splaying at least one of the plurality of electrical conductors away from the structural member;

potting a first region, wherein the first region surrounds at least a portion of the structural member and at least a portion of the at least one of the plurality of electrical conductors; and potting a second region adjacent to the first region, wherein the second region surrounds at least a portion of the structural member and at least a portion of the at least one of the plurality of electrical conductors.

16. The method of claim 15, further comprising:

using a first potting material in the first region; and using a second potting material in the second region;

wherein the first potting material has a lower hardness than the second potting material.

17. The method of claim 16, wherein the first potting material is silicone or polyurethane.

18. The method of claim 16, wherein the second potting material is an epoxy or polyester resin.

19. The method of claim 15, wherein potting a first region comprises:

placing a potting insert into the mold cavity coaxial to a long axis of the structural member; and injecting a first potting material between an interior surface of the mold cavity and an exterior surface of the potting insert.

20. The method of claim 19, wherein potting a second region comprises:

injecting a second potting material between an interior surface of the mold cavity and an exterior surface of the potting insert, wherein a portion of the second potting material is adjacent to the first potting material.

* * * * *